United States Patent
Vippagunta et al.

(10) Patent No.: US 12,360,878 B1
(45) Date of Patent: Jul. 15, 2025

(54) ADDRESSING ROOT CAUSE ANOMALY

(71) Applicant: Amazon Technologies, Inc., Seattle, WA (US)

(72) Inventors: Rajendra Kumar Vippagunta, Issaquah, WA (US); Sunayana Vempati, Seattle, WA (US); Syed Furqhan Ulla, Kirkland, WA (US); Yekesa Srinivasa Kosuru, Westford, MA (US); Namita Das, Seattle, WA (US); Devesh Ratho, Seattle, WA (US); Shashwat Srijan, Bellevue, WA (US); Lenon Alexander Minorics, Stuttgart (DE); Patrick Bloebaum, Mountain View, CA (US); David Kernert, Stuttgart (DE)

(73) Assignee: Amazon Technologies, Inc., Seattle, WA (US)

( * ) Notice: Subject to any disclaimer, the term of this patent is extended or adjusted under 35 U.S.C. 154(b) by 300 days.

(21) Appl. No.: 17/958,166

(22) Filed: Sep. 30, 2022

(51) Int. Cl.
*G06F 11/3604* (2025.01)

(52) U.S. Cl.
CPC ...... *G06F 11/3612* (2013.01); *G06F 11/3616* (2013.01)

(58) Field of Classification Search
None
See application file for complete search history.

(56) References Cited

U.S. PATENT DOCUMENTS

| | | | |
|---|---|---|---|
| 10,764,214 B1 | 9/2020 | Plenderleith et al. | |
| 11,354,184 B2 | 6/2022 | Jung | |
| 11,467,803 B2 | 10/2022 | Agrawal et al. | |
| 2015/0033084 A1 | 1/2015 | Sasturkar et al. | |
| 2017/0031803 A1* | 2/2017 | Wang | G06F 11/323 |
| 2017/0155672 A1 | 6/2017 | Muthukrishnan et al. | |
| 2018/0174062 A1 | 6/2018 | Simo et al. | |
| 2020/0125732 A1* | 4/2020 | Iyer | G06F 11/3612 |
| 2020/0287923 A1 | 9/2020 | Raghavendra et al. | |
| 2020/0372024 A1* | 11/2020 | Kulkarni | G06F 16/901 |
| 2021/0067401 A1 | 3/2021 | Abe et al. | |
| 2021/0165704 A1 | 6/2021 | Savir | |
| 2021/0286798 A1* | 9/2021 | Li | G06F 16/9024 |
| 2022/0019495 A1 | 1/2022 | Lavi et al. | |
| 2022/0067022 A1 | 3/2022 | Mishra et al. | |
| 2022/0318082 A1* | 10/2022 | Slinger | G06F 11/2263 |
| 2022/0334903 A1* | 10/2022 | Pole | G06F 16/24558 |
| 2022/0376970 A1* | 11/2022 | Chawathe | H04L 41/0654 |

(Continued)

OTHER PUBLICATIONS

P. Chen, Y. Qi, p. Zheng and D. Hou, "CauseInfer: Automatic and distributed performance diagnosis with hierarchical causality graph in large distributed systems," IEEE Infocom 2014—IEEE Conference on Computer Communications, Toronto, ON, Canada, 2014, pp. 1887-1895. (Year: 2014).*

(Continued)

*Primary Examiner* — Andrew M. Lyons
(74) *Attorney, Agent, or Firm* — Davis Wright Tremaine LLP

(57) ABSTRACT

A system generates a recommendation that includes at least one action to address at least one root cause anomaly that causes other anomalies occurred within a distributed system. The at least one root cause anomaly is determined by at least using a graph that represents the distributed system and metrics that are associated with the distributed system.

20 Claims, 17 Drawing Sheets

(56) References Cited

U.S. PATENT DOCUMENTS

| | | |
|---|---|---|
| 2023/0102002 A1 | 3/2023 | Garapati et al. |
| 2023/0138371 A1 | 5/2023 | Bandukwala et al. |
| 2023/0188408 A1* | 6/2023 | Pick .................... H04L 41/0627 709/224 |
| 2023/0205657 A1* | 6/2023 | Deboy .................. G06F 11/079 714/22 |
| 2023/0205666 A1* | 6/2023 | Govindaraju ............ G06N 5/01 719/318 |
| 2023/0267032 A1 | 8/2023 | Slinger et al. |

OTHER PUBLICATIONS

H. Wang et al., "Groot: An Event-graph-based Approach for Root Cause Analysis in Industrial Settings," 2021 36th IEEE/ACM International Conference on Automated Software Engineering (ASE), Melbourne, Australia, 2021, pp. 419-429. (Year: 2021).*

L. Wu, J. Tordsson, E. Elmroth and O. Kao, "MicroRCA: Root Cause Localization of Performance Issues in Microservices," NOMS 2020—2020 IEEE/IFIP Network Operations and Management Symposium, Budapest, Hungary, 2020, pp. 1-9. (Year: 2020).*

Janzing, et al., "Causal Structure Based Root Cause Analysis of Outliers, "Amazon Research Tubingen, Germany, arXiv:1912.02724v1, Dec. 5, 2019, 11 pages.

USPTO Final Office Action dated Apr. 25, 2024, U.S. Appl. No. 17/958,159, 18 pages.

USPTO Non-Final Office Action dated Sep. 29, 2024, U.S. Appl. No. 17/958,166, 28 pages.

USPTO Notice of Allowance dated Dec. 11, 2024, U.S. Appl. No. 17/958,159, 12 pages.

* cited by examiner

ADDRESSING ROOT CAUSE ANOMALY

CROSS-REFERENCE TO RELATED APPLICATIONS

This application is related to an incorporates by reference for all purposes the full disclosure of U.S. patent application Ser. No. 17/958,159, filed Sep. 30, 2022, entitled "SYSTEMS AND METHODS TO ANALYZE ROOT CAUSE ANOMALY."

BACKGROUND

Increased availability of computing resources as a service has led to a growing use of remote computing resource services providers to perform software application hosting for user software applications. When application performance issues arise, computing resource service providers generally provide access to logging and other resource usage data to determine causes of these performance anomalies. However, increased data usage and computing resources within such applications, among other reasons, makes it hard to determine the root cause of an application performance issue. Customers may turn to additional tools and resources to pinpoint the root cause, but the use of these additional tools and resources can be expensive and complex, increasing the time it takes to resolve the issue.

BRIEF DESCRIPTION OF THE DRAWINGS

Various techniques will be described with reference to the drawings, in which.

DETAILED DESCRIPTION

Figure 1:
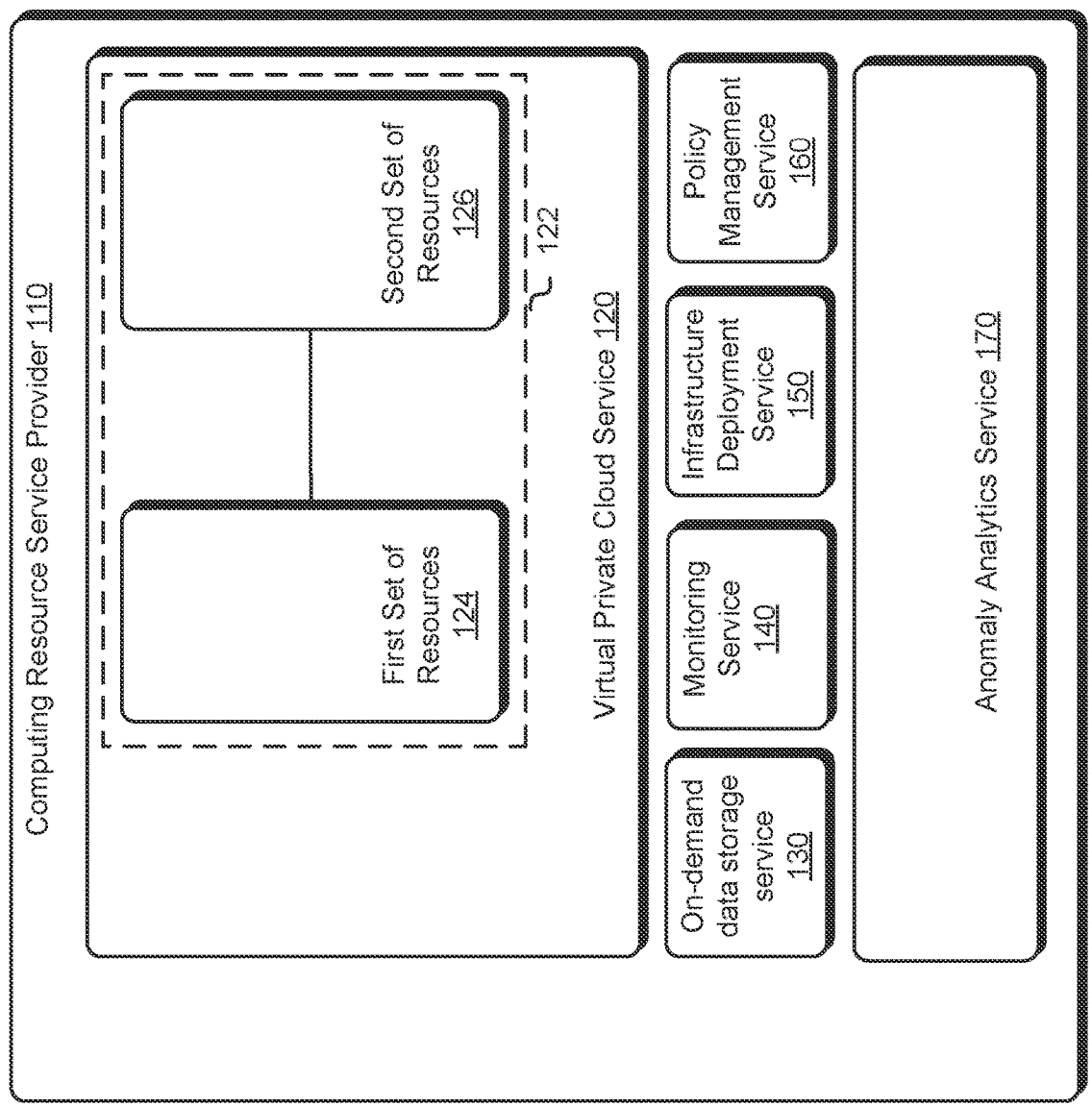
FIG. 1 shows an illustrative example of a system in which anomaly analytics service is implemented within the context of a computer resource service provider, according to at least on embodiment.
Figure 1:
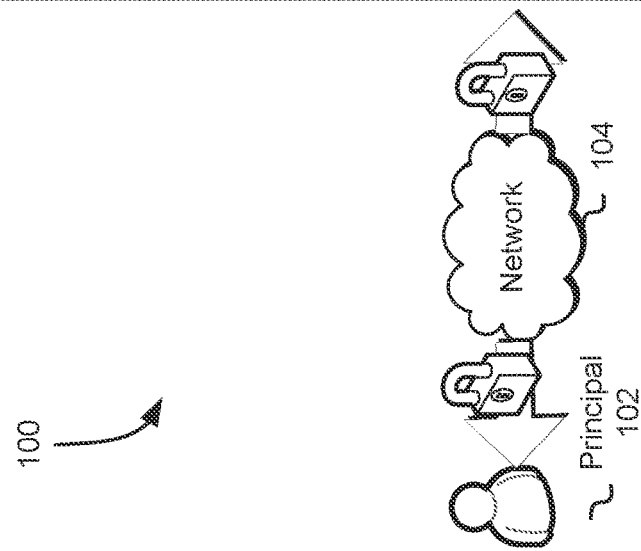

In an example, a system may be configured to pinpoint one or more root causes of anomalies that have occurred in a distributed system architecture. The distributed system architecture may include application stacks. The system may receive infrastructure templates generated or modified by a principal, an infrastructure deployment service, or a computing resource service provider. The infrastructure templates may define application stacks that include a set of resources. The templates may list resources that are within the application stack and also contain properties that describe such resources. The properties may indicate relationships between resources within application stacks. One example of such relationships can be dependencies between resources. Resources can be computing resources such as event-driven compute service, log service, database service, API gateway service, on-demand data storage service, monitoring service, infrastructure deployment service, and policy management service.

In the example, the system may receive additional information that may define the relationships between a resource within of the first application stack and another resource within a second application stack. The additional information may include policies that can determined by a policy management service provided by the computing resource service provider. Such policies may include roles and/or permissions. If one resource has access to another resource based on the policy, then there is a link or dependency between the two resources. There might be a score that indicates strength of the link or dependency between the two resources. Additional information can be provided or overridden by one or more accounts of principals.

Embodiments of the example may, in some circumstances, receive metrics associated with the resources within the distributed system architecture. Metrics can be either collected from individual resources within the distributed system architecture or by a monitoring service, provided by the computing resource service provider, that collects time series data from those resources. One or more application programming interface calls may be used to receive metrics data from different services provided by the computing resource service provider. Some metrics may belong to different recipes. Such recipe can be a group of metrics or metric-resource pairs (i.e., themes) that can be part of a particular domain. One example domain can be operational metrics, and another example domain can be business metrics. Operational metrics might be related to any kind of metric that is associated with functionality of at least one resource provided by the computing resource service provider. This can include any of various measures of technical aspects of a computing system, potentially including but not limited to various measures of technical aspects of a distributed system. Business metrics can be indicators that measure a business performance. Such business may operate one or more applications on the distributed system architecture. One example of a metric that could be art of business metrics is a number of sales, number of customers of the business.

In an example, the system may generate a graph based on infrastructure templates, additional information, and metrics. The system may list resources and exclude resources that are non-service related and generate a node for each resource. Then, the system, for each node, may generate nodes that correspond to resources that are associated with the node. Thus, each node of the graph may represent a resource-metric pair. Then, the system may use the additional information and properties of the infrastructure templates to determine dependencies between individual nodes of the graph.

In the example, the system may receive time series data that indicates anomalies associated with the resource-metric pair. By using the time series data, the system may mark nodes that represent the resource-metric pair which anomalies are detected. A chain of dependencies can be established within anomalous nodes based at least in part on dependencies between individual nodes of the graph. There may be multiple chain of dependencies within the marked graph that are not connected with each other.

Embodiments of the example may, in some circumstances, use a traverse algorithm to determine the root cause anomaly. The traverse algorithm parses each node within the chain of dependencies and find out the top/root node among the chain of dependencies. The chain of dependencies may include resource-metric pairs that belong to the same recipe. If there are more than two chain of dependencies that are not linked together, there can be two root cause anomalies that the system identifies. The system may use an attribution algorithm to determine a contribution score for each anomalous node within the chain of dependencies. The contribution score may indicate how each anomalous nodes contributes to the anomaly associated with a target node. The target node can be, but not limited to, sink anomalous node of the chain of dependencies. The system may analyze each anomalous node of the chain of dependencies without looking at the dependencies and determine additional factors that might affect the anomalies occurred within the distributed system architecture. For example, the additional factors may include analyzing how individual nodes affect other anomalous nodes without looking at the chain of dependencies. The system may determine what would be the most appropriate way to determine the root cause anomaly based on calculating robustness of the time series data. Alternatively, the system may use two or all three methods to pinpoint the root cause anomaly. Root cause anomaly may correspond to different recipes that belongs to different domains.

Embodiments of the example may, in some circumstances, obtain a list of standard operating procedures. Standard operating procedures can include scripts or programs designed to address anomalies or to recover from infrastructure failure. The system may prioritize or rank the list of standard operating procedures based on the pinpointed root cause anomaly and generate a recommendation to the principal based on standard operating procedures that could address the root cause anomaly. The recommendation may provide detailed information of the pinpointed root cause anomaly. Such detailed information may include relevant time series data, detected anomalies, pinpointed root cause anomaly, and standard operating procedures that could address the root cause anomaly. After a principal causes standard operating procedures to be performed on the infrastructure based on the recommendation, the system can obtain additional time series data indicating that the anomalies are resolved and no longer detected.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 shows an illustrative example of a system 100 in which various services, including anomaly analytics service 170 are implemented within the context of a computer resource service provider 110. The system 100 can be a distributed system. In at least one embodiment, FIG. 1 illustrates a principal 102 and a network 104 to access computing resource service provider 110. The principal 102 may be related to one or more accounts of the computing resource service provider 110. The principal 102 may be a user, a group, an organization, a role, or a collection and/or combination of these or other such entities. The principal may use one or more client devices to access computing resource service provider 110. The one or more accounts of the computing resource service provider 110 may have one or more roles associated with the one or more accounts. In one embodiment, policy management service 160 within the computing resource service provider may manage the one or more roles. The one or more accounts related to the principal 102 may manage the infrastructure 122 by accessing the computing resource service provider 110 through a network 104. For example, principal may send one or more API calls to provision and operate the infrastructure 122.

In at least one embodiment, one or more software applications may run on the infrastructure 122. The infrastructure 122 can be an infrastructure for a distributed system. The infrastructure may be used for various purposes, such as to operate as servers supporting a website, to operate business applications, or generally, to serve as computing power for the principal 102. Other applications for the infrastructure may be to support database applications, electronic commerce applications, business applications and/or other applications. The infrastructure may be instantiated on physical computing devices hosted and operated by a virtual private cloud service 120. The infrastructure 122 may include a first set of resources 124 and a second set of resources 126 that may be configured to instantiate virtual machine instances onto virtual computing systems. Alternatively, in one embodiment, the infrastructure 122 may include only one set of resources or include more than two sets of resources. In various embodiments, at least one resource within the infrastructure may be distributed across multiple regions. Such region may be based on fault zones. Fault zones may be logical divisions of resources such that failure of one fault zone may not affect the other zones. Fault zones may differ based on the type of failures being isolated. Examples of different failure types may include power outages, civil unrest, hard drive failures, natural disasters, and extreme weather events. As a result, fault zones may be divided into different categories for dividing computing resources for fault isolation, such as by geographic region, data center, room in a data center, server rack in a data center, individual server among a group of servers, hard drive cluster, and backup generator. In some cases, different types of fault zones may be nested within other fault zones (i.e., hierarchical), however, in other cases, some types of fault zones may overlap or be isolated from other types of fault zones.

The set of resources include resources that may be provided by the computing resource service provider 110. Resources may include, without limitation: certificate manager of private certificate authority service, console of full-stack application service, user-interface (UI) builder of full-stack application service, application programming interface (API) gateway service, API gateway service for Hypertext Transfer Protocol Secure (HTTPS), application configuration service, secure data transfer service, application connection service, auto-scaling service, application-level networking service, container application service, non-persistent desktop and application service, serverless GraphQL and Pub/Sub API service, Prometheus-compatible monitoring and alerting service, software development framework, serverless interactive query service, resource audit service, data-protection service, batch management service, customizable billing and budget service, certificate management service, chatroom service, cloud-based integrated development environment, infrastructure deployment service 150, content delivery network service, cloud resource discovery service, account monitoring service, metrics service 140, artifact repository service, fully managed continuous integration service, source control service that hosts private Git repositories, automated software deployment service, developer tools, automated software release service, application development service, authentication management service, contact analytics service, account management service, computing resource service provider cost and usage service, visual data preparation tool, resource management service, data processing service, data migration service, virtual computer system service, fully managed container registry service, container orchestration service, cloud storage service, Kubernetes service, orchestration service for deploying applications, load-balancing service, big-data processing service, in-memory data store and cache service, event-based service, data management and analytics service, fault injection experiments service, security management service, time-series forecasting service, fraudulent activity detection service, file systems service, game server hosting service, networking service, serverless data integration service, satellite communications service, threat detection service, health data storage and analytics service, policy management service 160, incident management console, automated vulnerability management service, Internet of Things (IoT) service, interactive video service, intelligent search service, Apache Cassandra-compatible database service, key management service, data lakes service, event-driven function service, conversational interfaces service using natural language models, software license management service, virtual private server service, location-based service, industrial equipment monitoring service, anomaly detection service, image analytics service, data security and protection service, blockchain network service, video processing and storage service, managed message broker service, Apache Kafka service, orchestration service for Apache Airflow, graph database service, content creation pipeline service, open-source search and analytics suite, configuration management service, video analysis service, personalized recommendations service, outbound and inbound marketing communications service, fully managed ledger database service, cloud-scale business intelligence service, relational database service, cloud data warehouse service, resiliency assessment service, cloud-based simulation service, domain name system (DNS) web service, on-demand data storage service 130, machine learning service, secrets management service, cloud security posture management service, email service, code-signing service, simple notification service, distributed message queuing service, file transfer service, voice analytics service, web application firewall service, desktop virtualization service, or debug service for distributed applications.

In at least one embodiment, various services may interact with the infrastructure 122 hosted by the virtual private cloud service 120. Computing resource service provider 110 may provide services such as, without limitation, on-demand data storage service 130, monitoring service 140, infrastructure deployment service 150, policy management service 160, and anomaly analytics service 170. In one embodiment, there may be other resources noted above that might be provided by the computing resource service provider 110. In addition, each of the services may include one or more service interfaces that enable the services to access each other (e.g., to enable the monitoring service 140 to store data in or retrieve data from the on-demand data storage service). In some embodiments, the principal 102 and services may utilize the same interface to submit requests to a service.

On-demand data storage service 130 may be a collection of computing resources collectively configured to synchronously process requests to store and/or access data. The on-demand data storage service 130 may operate using resources (e.g., databases) that enable the on-demand data storage service 130 to locate and retrieve data quickly, so as to allow data to be provided in response to requests for the data. For example, the on-demand data storage service 130 may maintain stored data in a manner such that, when a request for data object is retrieved, the data object can be provided (or streaming of the data object can be initiated) in a response to the request. As noted, data stored in the on-demand data storage service 130 may be organized into data objects. The data objects may have arbitrary sizes except, perhaps for certain constraints on size. Thus, the on-demand data storage service 130 may store numerous data objects of varying sizes. The on-demand data storage service 130 may operate as a key value store that associated data objects with identifiers of the data objects which may be used by the principal 102 to retrieve or perform other operations in connection with the data objects stored by the on-demand data storage service 130. The on-demand data storage service 130 may be accessible from the monitoring service 140 and anomaly analytics service 170. Access to the on-demand data storage service 130 by a principal 102, another service, or another entity may be through appropriately configured API calls.

The on-demand data storage service 130 may manage one or more logical data containers. Logical data containers may be capable of storing data provided by different resources from computing resource service provider 110. For example, monitoring service 140 may collect time series data and send to any logical data containers managed by the on-demand data storage service 130. In one embodiment, such logical data container may be a resource of computing resource service provider 110 that is configurable and definable by principal 102 or any other principals of the computing resource service provider 110 using an API. Further, logical data containers may be identifiers or may have additional structure. For example, logical data containers considered as being within the scope of the present disclosure include queues, databases, and other mechanisms for storing data in an organized manner. Further, logical data containers, in some embodiments, may themselves contain logical data containers. As an example, a data storage service may provide uniform resource identifiers (URI) for data objects to use to reference logical data containers and objects contained therein. A URI for a data object may contain an identifier of the logical data container and an identifier of the data object. URIs for data objects in the same logical data container may contain the same identifier of the logical data container but different identifiers for the different objects. In this manner, the URIs for the data objects of a logical data container may form a namespace. A subspace of the namespace may be considered as a logical data container. Similarly, databases may have sub-databases and, generally, other types of logical data containers may store data objects and certain subsets of the data objects may be categorized as being in logical data containers corresponding to the subsets.

Monitoring service 140 may be a collection of computing resources collectively configured to provide data for infrastructure 122. Data may include performance, operational and business data in a form of logs and metrics. Logs and metrics data includes time series data that stores at least one sequence of data points indexed in time order. In one embodiment, monitoring service 140 may collect logs that are published by one or more resources provided by the computing resource service provider 110. At least one resource of the one or more resources may include resources that are specifically configured to natively publish logs on principal's 102 behalf.

In another embodiment, monitoring service 140 may be configured to collect infrastructure metrics from resources that are within the infrastructure 122. Resources within the infrastructure 122 are associated with at least one metric. Furthermore, monitoring service 140 may be configured to collect metrics associated with applications that are running on the infrastructure 122. Metrics includes, without limitation: total number of requests (e.g., HTTP, received, total amount of data transferred out, total amount of data transferred in, the number of requests that returned an error in the HTTP status code 400-499 range (i.e., 4XX Errors), the number of requests that returned an error in the HTTP status code 500-499 range (i.e., 5XX Errors), latency (e.g., back-end responsiveness, API calls, HTTP request, successful requests), cache capabilities, central processing unit (CPU) utilization, memory utilization, HTTP status counts, total number of instances available, total number of idle instances, percentage of instances in a fleet that are being used, rejected requests, tokens allocated to requests, number of successful connections (e.g., WebSocket), number of server-side/client-side errors, number of unsuccessful connections (e.g., WebSocket), subscription errors, amount of time connection stays open, number of active connections (e.g., WebSocket), state information of query, total execution time (e.g., queries), query planning time, query queue time, processed bytes by query, maximum number of read/write capacity units, percentage of provisioned read/write capacity units, rejected item-level requests, throttled requests, read throttle events (i.e., request that exceed the provisioned read capacity units), invocations (i.e., number of times that function code is invoked), throttled invocation requests, duration (i.e., amount of time function code spends processing an event), concurrent executions (i.e., number of function instances that are processing events), number of failed execution, number of started executions, conditional check failed requests, consumed read capacity units, consumed write capacity units, bytes returned, counts of returned items or records, system errors, count of deleted time-to-live items, transaction conflict, user errors, and etc.

In various embodiments, a recipe is a group of metrics or resource-metric pairs. The recipe can be specifically adapted to a principal 102 of the computing resource service provider, referring to the recipe being reflective of particular properties associated with the principal 102. The recipe may be part of a different domain. For example, one domain can be an operational metrics domain and another domain can be a business domain. The operational metrics domain might be relation to any kind of metric that is associated with a functionality of at least one resource provided by the computing resource service provider. Also, this can include any of various measures of technical aspects of a computing system, potentially including but not limited to various measures of technical aspects of a system 100. Business metrics domain might be indicators that measure a performance of a business. In an example, one recipe of a business metric domain can be a number of sales or number of total customers of the business. Such business may operate one or more applications on the infrastructure 122.

In at least one embodiment, monitoring service 140 may collect times series data of one or more metrics associated with at least one resource of the first set of resources 124 and/or the second set of resources within the infrastructure 122. In one embodiment, monitoring service 140 can detect one or more anomalies from the time series data similar to the anomaly analytics service 170 described below. The monitoring service 140 may send time series data (with or without anomalies attached) to the on-demand data storage service 130 or anomaly analytics service 170.

Infrastructure deployment service 150 may be a collection of computing resources collectively configured to set up infrastructures such as infrastructure 112 and to allow the principal 102 to manage resources that are within such infrastructures. The infrastructure deployment service may provision and configure those resources for the principal 102. One or more infrastructure templates might be used to deploy one or more set of resources of the infrastructure 122. In one embodiment, infrastructure templates might be encoded in a human-readable format (e.g., JavaScript Object Notation (JSON), YAML, Extensible Markup Language (XML)) and may describe resources within a set of resources and their properties. Of course, various other formats which may be utilized in the manner described in connection with JSON and JSON-like formats are also contemplated and within the scope of this disclosure. In another embodiment, one template may correspond to one set of resources, so two or more infrastructure templates represent an infrastructure. A set of resources can be an application stack that can be managed as a single unit. The set of resources can be a subsystem within a distributed system. In one embodiment, one template may correspond to a single application stack. When the principal submits one or more infrastructure templates, then the infrastructure deployment service 150 may provision all resources within infrastructure and may cause all resources to be deployed within infrastructure hosted by the virtual private cloud service 120.

Policy management service 160 may be a collection of computing resources collectively configured to manage policies on behalf of principals of the computing resource service provider 110. The policy management service 160 may include an interface that enables principles to submit requests related to the management of policy. Such requests may, for instance, be requests to add, delete, change, or otherwise modify policy for the customer or for other administrative actions, such as providing an inventory of existing policies and the like. The policy management service 160 may also interface with other services to enable the services to determine whether the fulfillment of a pending request is allowable according to policy corresponding to the customer for which the request was made. For example, when a service receives a request, the service (if it has not locally cached such information) may transmit information about the request (and/or the request itself) to the policy management service 160 which may analyze policies for the customer to determine whether existing policy of the customer allows fulfillment of the request and provide information to the service according to the determination.

In at least one embodiment, policy management service generates a policy that includes a permission. The permission may specify a principal, a resource, an action, a condition, and an effect. In some embodiments, the permission may also specify a plurality of one or more of these elements such as, for example, a set or class of users, a collection of resources, several different actions, and/or multiple conditions. In some embodiments, the permission may specify one or more wildcard or otherwise modifiable characters that may be used to denote that the permission 202 may be modified to make the permission applicable to different users and their associated resources. In some embodiments, the policy may be expressed in a language independent format such as JSON. Examples discussed in this disclosure may be in JSON format or in a format similar to JSON and as illustrations of various embodiments which may be implemented. Of course, various other formats which may be utilized in the manner described in connection with JSON and JSON-like formats are also contemplated and within the scope of this disclosure.

A principal may submit API calls that cause an action associated with a resource to be performed and/or any entity to which permissions associated with a resource may be granted. As an example, a permission may have a principal element specified in the following manner:

"Principal": "rn:ws:iam::ducksfan8"

In some embodiments, the principal is identified by a resource name that uniquely identifies the principal. A principal may include one or more name spaces that include additional information regarding the principal. For example, "rn" may refer to a resource name prefix and identifies the subsequent information as part of a resource name; "ws" may refer to a partition namespace that the resource is in; "iam" may refer to a service namespace that identifies a service of a computing resource service provider (e.g., the computing resource service provider may provide services related to identity and access management); namespaces may additionally be omitted (note that there are two semi-colons in the example above between "iam" and "ducks-fan8")—in some formats and/or for some resources, a region namespace may be option; and "ducksfan8" may refer to an identifier for the account, such as the account that owns the resource specified in the permission.

resources may be organized in a hierarchy, and may use structures such as folders, directories, buckets, etc. to organize sets of computing resources into groupings. In some cases, policies and/or permissions may be applied directly to a bucket and grant cross-account access to an infrastructure. In some embodiments, the resource may be identified by a resource name that uniquely identifies the resource. In some cases, the resource may share a same naming convention as the principal or other elements of the permission. However, this need not be the case, as each separate element of a permission may use a naming convention, namespace, format, etc. that is independent of other elements.

The action may be the specific action or actions that will be allowed or denied by the permission. Different types of services (e.g., having different service namespaces) may support different actions. For example, an identity and account management service may support an action for changing passwords, and a storage service may support an action for deleting objects. An action may be performed in association with the resource and may, for example, be identified by a type of API call, a library call, a program, process, series of steps, a workflow, or some other such action. Wildcards may be used to specify multiple actions. For example, an action element described as "Action": "storage:*" may refer to all APIs supported by a storage service. As a second example, an action element described as "Action": "iam:*AccessKey*" may refer to actions supported by an identity and access management service in connection with access keys of a service—illustrative examples may include actions related to creating an access key (e.g., a "CreateAccessKey" action may exist), deleting an access key (e.g., "DeleteAccessKey"), listing access keys (e.g., "ListAccessKeys"), and updating an existing access key (e.g., "UpdateAccessKey").

The condition element may be one or more conditions that specify when a policy is in effect. In some embodiments, the condition element is optional and may be omitted in some permissions. Conditions may be described as Boolean expressions that may be used to determine whether the policy is in effect (i.e., if the expression evaluates to TRUE) or not in effect (i.e., if the expression evaluates to FALSE). Policies that are not in effect may be unenforced or ignored by an authorization module (such as those described elsewhere in this). In some embodiments, conditions in a permission may be evaluated against values provided as part of a web API request corresponding to one or more APIs specified in the action element. Various other types of condition operators may exist, which may be used for comparing string conditions, numeric conditions, Boolean conditions, binary conditions (e.g., testing values in binary format), IP address conditions (e.g., testing values against a specific IP address or range of IP addresses), and more. Conditions may, furthermore, include quantifiers. For example, a string condition may include an operator such as "StringEquals" that compares whether two strings are equal, and a similar operator may include a quantifier such that "StringEqualsIfExists" may be used to compare two strings when the key value exists in the context of an evaluation. Quantifiers may be used in conjunction with wildcards where multiple resources matching a wildcard expression may support different context keys.

An effect may refer to whether the permission is used to grant or deny access to the computing resources specified in the permission in the resource element. An effect may be an ALLOW effect, which grants access to a resource, and a DENY effect, which denies access to a resource. In some embodiments, access to computing resources of a computing resource service provider is denied by default and a permission affirmatively including an ALLOW effect is required.

Anomaly analytics service 170 may be a collection of computing resources collectively configured to detect one or more root cause anomalies. In one embodiment, anomaly analytics service includes a separate monitoring service to obtain times series data of one or more metrics associated with at least one resource of either first set of resources 124. or second set of resources 126. In various embodiments, anomaly analytics service 170 may receive metrics data (with or without anomalies attached) associated with those metrics from monitoring service 140 and/or on-demand data storage service 130.

In at least one embodiment, anomaly analytics service 170 provides services to automatically generate and apply artificial intelligence and machine learning techniques to supplied data in order to detect anomalies in the data. An anomaly, which may sometimes be referred to as an outlier, is a portion of a time series that exhibits an interesting, unusual, atypical, or useful trend, pattern, or value. For example, if a time series represents the number of units of a product sold over time, a period in which the units sold were considerably higher than the average might be considered an anomaly, or outlier. Such patterns can be difficult to detect, particularly because some variations, such as those that occur seasonally or on different times of the week, may be considered normal.

In at least one embodiment, anomaly analytics service 170 performs operations to train one or more machine learning models to perform anomaly detection on input time series. This may sometimes be referred to as point detection, outlier detection, and so forth. The system may automatically select an appropriate type of machine learning model based on analysis of a pattern exhibited in the time series and train the model without input from the user other than the data and other basic information, such as the desired frequency prediction. While training, a subset of a provided time series data might be used, such as 70% of the data points in a time series data, and 30% might be reserved for performing inference and identifying anomalies. In some embodiments, the inferencing stage can be performed directly subsequent to the training stage, as part of the training workflow.

In various embodiments, anomaly analytics service 170 may include a machine learning service that provides capabilities for generating, training, or using various machine learning algorithms and models. These could include, but are not necessarily limited to, neural networks, decision trees, random forests, support vector machines, and so on. In one embodiment, anomaly analytics service 170 may provide back-testing service such that principal 102 can determine the accuracy of such machine learning algorithms and models.

In at least one embodiment, anomaly analytics service 170 may receive, from the infrastructure deployment service 150, an infrastructure template that includes one or more properties of each resource of one or more set of resources (e.g., first set of resources 124, second set of resources 126). Anomaly analytics service 170 may determine or obtain a table that lists one or more metrics associated with individual resources of the one or more set of resources. In one embodiment, anomaly analytics service 170 can obtain the table from the monitoring service 140. Anomaly analytics service 170 may generate a first graph based at least in part on the infrastructure template and each node of the first graph corresponds to resources of the one or more set of resources. Then, the anomaly analytics service 170 may generate a second graph based at least in part on the first graph by generating additional nodes that correspond to both resources and metrics.

In at least one embodiment, anomaly analytics service 170 may detect two or more anomalies using the time series data. Alternatively, anomaly analytics service 170 may receive time series data that has two or more anomalies indicated within. In one embodiment, anomaly analytics service 170 may receive time series data that has two or more anomalies from $3^{rd}$-party services that are associated with the principal 102. The anomaly analytics service 170 may determine a subset of nodes of the graph that are associated with the two or more anomalies. Then, the anomaly analytics service 170 may determine a node among the subset of nodes of the graph based at least in part on the directed graph and the time series data. The node can be the root cause anomaly that causes or contributes to other anomalies of the two or more anomalies.

In at least one embodiment, the anomaly analytics service 170 may identify one or more standard operating procedures (SOP) from a set of SOPs that may resolve the root cause anomaly. In addition, the anomaly analytics service 170 may provide the principal 102 a recommendation that includes the one or more SOPs. Anomaly analytics service 170 may operate as an Anomaly analytics module that can be stored as a container. In one embodiment, the anomaly analytics module is anomaly analytics module 1610 described in conjunction with FIG. 16. Anomaly analytics service 170 may operate as an anomaly analytics module that can be stored as a container. In one embodiment, the anomaly analytics module is anomaly analytics module 1610 described in conjunction with FIG. 16.

Figure 2:
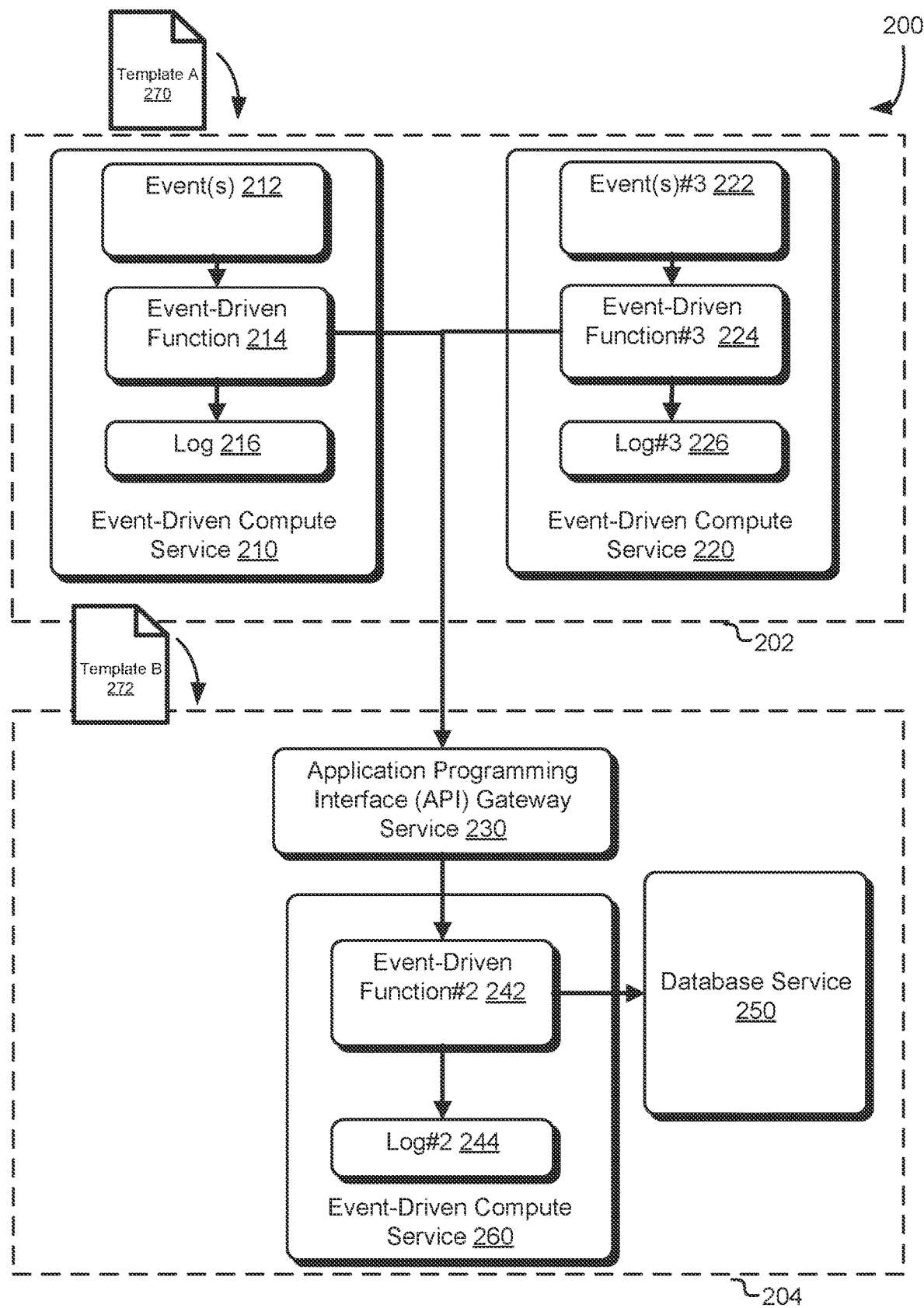
FIG. 2 shows an illustrative example of an infrastructure, in accordance with at least one embodiment.

FIG. 2 shows an illustrative example of an infrastructure 200 that one or more applications could be based on. In one embodiment, infrastructure 200 represents a cloud computing system. In another embodiment, the infrastructure 200 can be the infrastructure 122 described in conjunction with FIG. 1. In various embodiments, the infrastructure 200 includes physical hardware that can be located at different regions. Such hardware may include networking equipment, like switches, routers, firewalls, and load balancers, storage arrays, backup devices, and servers. Such region may be based on fault zones. Fault zones may be logical divisions of resources such that failure of one fault zone may not affect the other zones. Fault zones may differ based on the type of failures being isolated. Examples of different failure types may include power outages, civil unrest, hard drive failures, natural disasters, and extreme weather events. As a result, fault zones may be divided into different categories for dividing computing resources for fault isolation, such as by geographic region, data center, room in a data center, server rack in a data center, individual server among a group of servers, hard drive cluster, and backup generator. In some cases, different types of fault zones may be nested within other fault zones (i.e., hierarchical), however, in other cases, some types of fault zones may overlap or be isolated from other types of fault zones.

In at least one embodiment, the infrastructure 200 may comprise one or more sets of resources. The one or more sets of resources may include a first set of resource 202 and a second set of resource 204. Such set of resources may be application stacks that acts as a collection of resources that principals can manage as a single unit. Services such as infrastructure deployment service 150 from the computing resource service provider 110 may provide services to the principals such that principals define the set of resources using one or more infrastructure templates such as infrastructure template A 270 and/or infrastructure template B 272. The infrastructure template A 270 may define the first set of resources 202 and the infrastructure template B 272 may define the second set of resources 204. In one embodiment, services such as infrastructure deployment service 150 provide snippets of the infrastructure template that defines one or more resources.

In at least one embodiment, infrastructure templates may include a description section to allow principals to add comments. The infrastructure templates may include a metadata section to allow principals to add details about one or more resources. The infrastructure templates may include a custom value that the principal can define. The custom values include dynamic values that are stored and managed in other services of the computing resource service provider. The infrastructure templates may include conditional statements that define the circumstances under which entities (e.g., resources, properties of such resources) are created or configured. infrastructure templates may include one or more declarations of one or more resources within a set of resources.

In at least one embodiment, the infrastructure template A 270 may define the first set of resources 202 within infrastructure 200. Also, the infrastructure template B 272 may define the second set of resources 204 within infrastructure 200. The first set of resources 202 may include resources such as events 212 and 222, event-driven functions 214 and 224, logs 216 and 226. Arrows or edges indicate dependencies of the resources within the first set of resources. For example, event-driven function 214 may depend on the events 212 and log 216 may depend on the event driven function 214 and resources events 212, event-driven function 214, and log 216 may be part of event-driven compute service 210. In another example, event-driven function 224 may depend on the events 222 and log 226 may depend on the event driven function 224 and resources events 222, event-driven function 224, and log 226 may be part of event-driven compute service 220.

In one embodiment, the event-driven compute service 210 may receive and monitor events 212 from multiple requests from principals or resources provided by the computing resource service provider. Events 212 may include a web API request to start a job. The event-driven compute service 210 determines how to splice the events which may operate on different logics and/or different tables. As an example, the event-driven compute service 2604 may include a mapping of event-driven function 214 to different resources provided by the computing resource service provider. Event-driven function 214 may include executable code, source code, applications, scripts, routines, function pointers, input parameters to a routine, callback functions, API requests, or any combination thereof. As an example, the event-driven compute service 210 may include a mapping of compliance routines to events that indicate which routines should be invoked. Invoking a routine may include executing code or providing executable code as part of a request. Log 216 may include output from of event-driven function 214 and one or more metrics that are associated with the event-driven compute service 210. In an embodiment, event-driven compute service 210 may be event-driven compute service 220 and/or event-driven compute service 260

In at least one embodiment, an API gateway service 230 may depend on both event driven functions. The API gateway service 230 may provide creating, publishing, maintaining, monitoring, and securing REST, HTTP, and WebSocket APIs at any scale. For example, the API gateway service 230 may create RESTful APIs that are HTTP-based, enable stateless client-server communication, and implement standard HTTP methods such as GET, POST, PUT, PATCH, and DELETE. The API gateway service 230 API Gateway may handle all the tasks involved in accepting and processing up to hundreds of thousands of concurrent API calls. These tasks may include traffic management, authorization and access control, monitoring, and API version management. In other words, API gateway service 230 may act as a front door for applications to access data, business logic, or functionality from backend services, such as resources provided by the computing resource service provider, any web application, or real-time communication applications. Some of the resources may be provided by different computing resource service providers. In various embodiments, API gateway service 230 can be an API management service that may turn legacy resources into modern REST-based APIs by creating façades for the principal's back-end services.

In at least one embodiment, the event-driven compute service 260 may depend on the API gateway service 230. And the database service 250 may depend on the event-driven compute service 260. The database service 250 A database service may be a collection of computing resources that collectively operate to run one or more databases for one or more principals. The principals of the computing resource service provider may operate and manage a database from the database service by utilizing appropriately configured API calls. This, in turn, may allow a principal to maintain and potentially scale the operations in the database. Other services include, but are not limited to, object-level archival data storage services, services that manage and/or monitor other services and/or other services.

Figure 3:
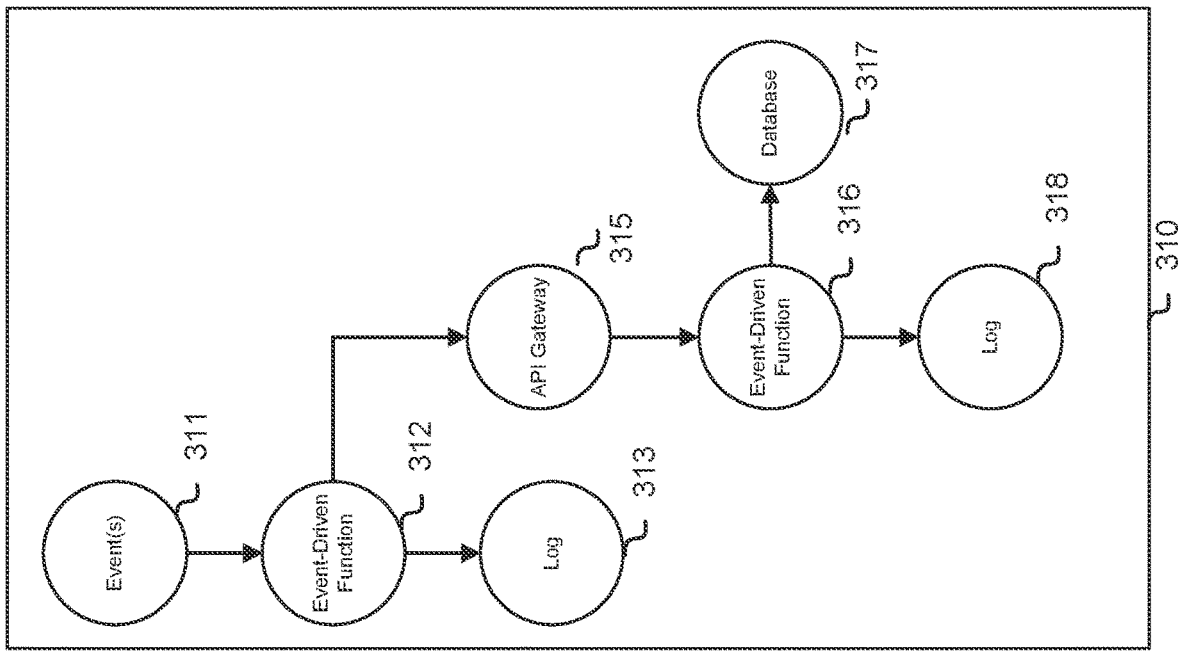
FIG. 3 shows an illustrative example of generating a graph, in accordance with at least one embodiment.
Figure 3:
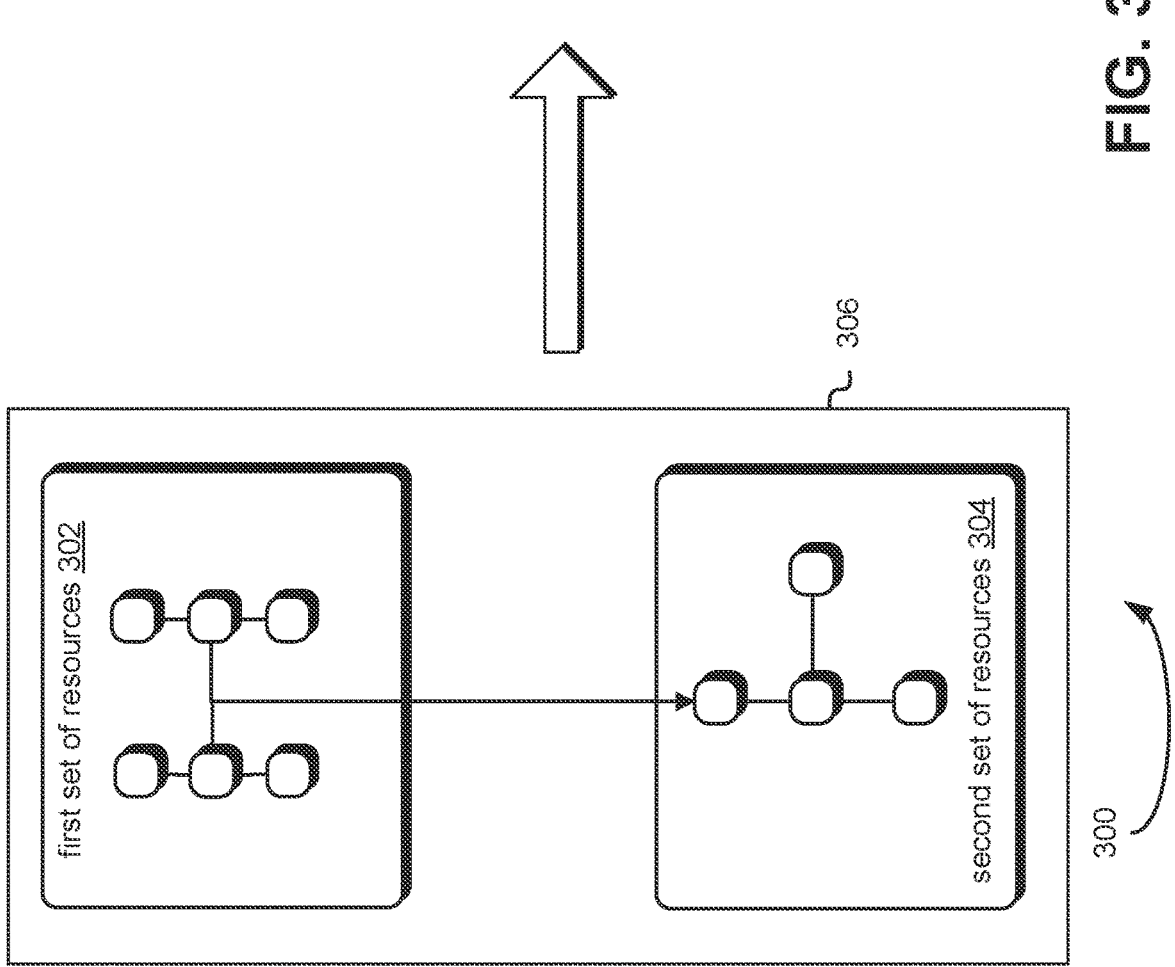

FIG. 3 shows an illustrative example 300 of generating a dependency graph using infrastructure 306. In various embodiments, infrastructure 306 may be infrastructure 200 described in conjunction with FIG. 1 or infrastructure 122 described in conjunction with FIG. 2. The infrastructure 306 may include a first set of resources 302 and a second set of resources 304. In various embodiments, the first set of resources 302 may be the first set of resources 202 described in conjunction with FIG. 2 and the second set of resources 304 may be the second set of resources 204 described in conjunction with FIG. 2 The first set of resources 302 may have six resources that are connected based on dependencies. The second set of resources 304 may have four resources that are connected based on dependencies.

In at least one embodiment, services or a computer system may generate a graph 310 based at least in part on infrastructure 306. Specifically, one or more infrastructure templates described in conjunction with FIGS. 1-2 may be used to determine one or more properties of two or more resources within the first set of resources 302 or the second set of resources. The one or more properties may be used to determine dependencies between resources within the first set of resources 302 or the second set of resources. For example, the properties may indicate that resource B of the first set of resources 302 depends on resource A of the first set of resources 302. Additionally, the properties may not be enough to determine dependencies between a resource within of the first set of resources 302 and another resource within of the second set of resources 302. In other words, additional information may be required to determine dependency information between sets of resources.

In one embodiment, the additional information includes policies that are determined by policy management service 160 described in conjunction with FIG. 1. Such policies may include roles and/or permissions that define the relationships between a resource within of the first set of resources 302 and another resource within of the second set of resources 302. For example, going back to FIG. 2. By looking at the policies associated with the API gateway service 230, additional information may indicate that the API gateway service 230 depends on both even-driven functions 214 and 224. Alternatively, policies associated with both even-driven functions 214 and 224 may indicate the same dependency. In one embodiment, additional information can be provided by one or more accounts of principals.

Returning back to FIG. 3, graph 310 includes nodes and each individual node corresponds or represents each resource from both the first set or resources 302 and the second set of resources 304. Graph 310 can be a multigraph, directed graph, undirected complete graph, connected graph, dependency graph, and weighted graph. In various embodiments, node 311 may correspond to events 212; node 312 may correspond to event-driven function 214; node 313 may correspond to log 216; node 315 may correspond to API gateway service 230; node 316 may correspond to even-driven function 242; node 317 may correspond to database service 250; and node 318 may correspond to database service 250. The dependencies between the nodes might be determined using the one or more properties from one or more infrastructure templates and the additional information. Node 318 may depend on node 316; node 317 may depend on node 316; node 316 may depend on node 315; node 315 may depend on node 312; node 313 may depend on node 312; and node 312 may depend on node 311. In one embodiment, not all resources from the templates may be included in graph 310. For example, resources from event-driven computer service 220 may not be included in graph 310.

In one embodiment, there may be confidence scores associated with at least one edge or dependency between nodes within graph 310. In another embodiment, each edge may have different confidence scores that shows a strength of dependency. Going back to FIG. 2 if the link between API gateway service 230 and event-driven function 214 may be stronger than the link between API gateway service 230 and event-driven function 224, the link between API gateway service 230 and event-driven function 214 may have a higher confidence score and the API gateway service 230 may be more likely to depend on event-driven function 214 compared to event-driven function 224. In various embodiments, such confidence scores might be determined by the policies. In another embodiment, principals can send one or more API calls to modify or override such confidence scores. In various embodiments, the graph 300 may be generated by the anomaly analytics service 170 described in conjunction with FIG. 1

Figure 4:
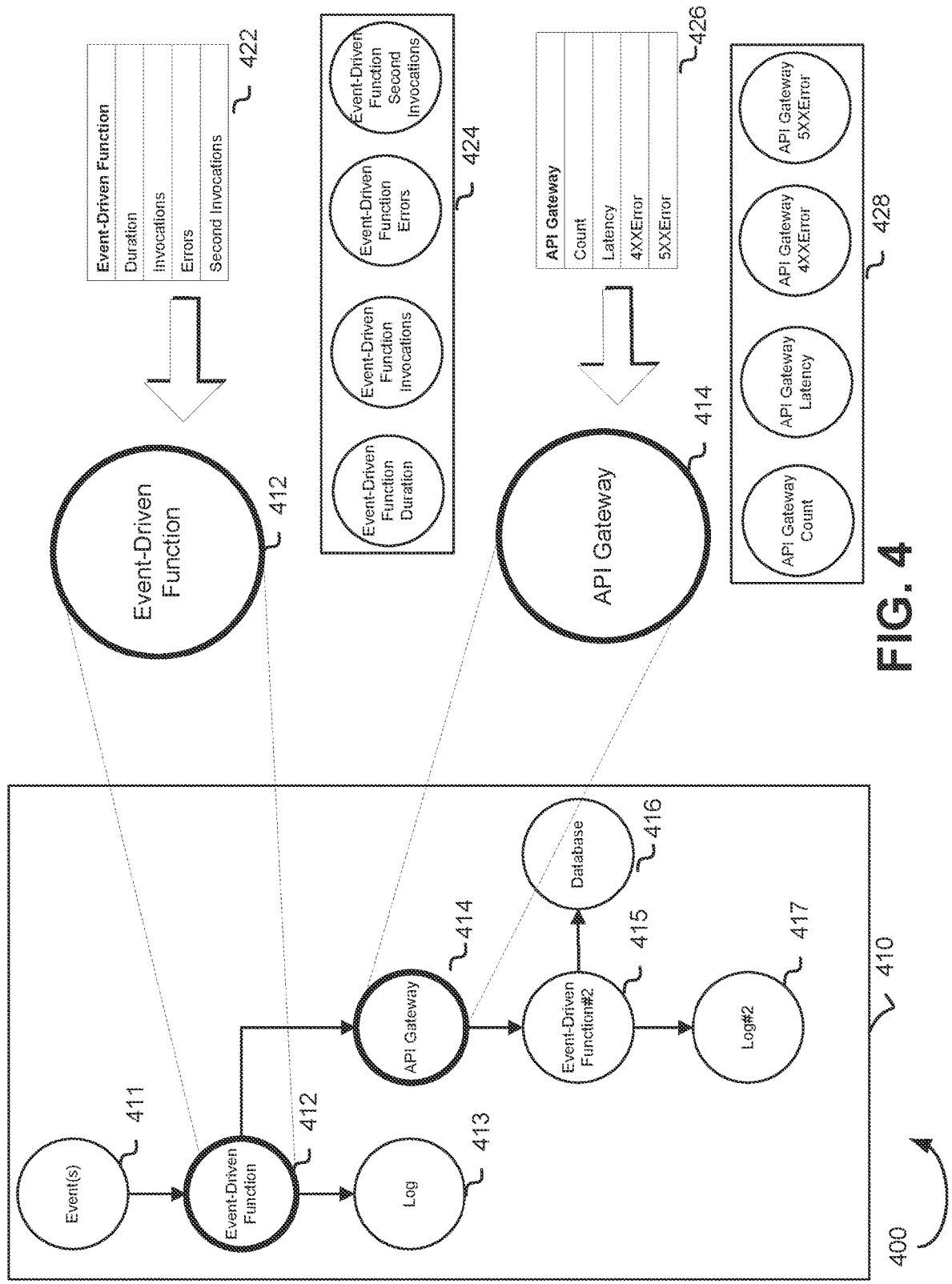
FIG. 4 shows an illustrative example of generating a graph, in accordance with at least one embodiment.

FIG. 4 shows an illustrative example 400 of generating a graph 410 using at least two or more metrics 424 and 428. The graph 410 can be the graph 310 described in conjunction with FIG. 3. Each node of the graph 410 may represent each resource within such infrastructure described in conjunction with FIGS. 1-3. Each resource is associated with at least one metric and the metric information may be retrieved by each service or monitoring service 140 described in conjunction with FIG. 1 by performing one or more API calls. For example, node 412 that represents the event-driven function might be associated with four metrics 422. The four metrics 422 include duration, invocations, errors, and second invocations. For each metric type, new nodes can be made. A first new set of nodes 424 may be created and it may include duration of event-driven function, invocation of event-driven function, errors of event-driven function, and second invocations of event-driven function. Similarly, node 414 that represents the API gateway service may have four metrics 426 that are associated with the API gateway service. The four metrics 426 include count, latency, 4XX Error, and 5XX Error. For each metric type, new nodes are made. A second new set of nodes 428 can be created and it may include duration of event-driven function, invocation of event-driven function, errors of event-driven function, and second invocations of event-driven function.

In at least one embodiment, there might be configuration nodes in the graph that represent resources that are not operationally functional. In other words, resources that correspond to the configuration nodes may not have any runtime characteristics, meaning that the resources may no act as a service provided by the computing resource service provider. One way to determine whether a node is a configuration node can be to see whether there are any metrics associated with the resource that the configuration node is representing. If there are no metrics associated with the resource, this may mean that the node that represents the resource is the configuration node, and the configuration node is deleted from the graph 410. In one embodiment, removing the configuration node can be done before drawing the edges of the graph 410. In another embodiment, configuration nodes may be determined by using infrastructure templates provided by the infrastructure deployment service 150 described in conjunction with FIG. 1 and policies of at least one or more resources defined by the policy management service 160 described in conjunction with FIG. 1. Example configuration nodes may represent policies, notification service subscription, event-driven function service subscription, structured query language (SQL) queries, etc. Those configuration nodes may be used to determine the dependency between other non-configuration nodes of graph 410.

In at least one embodiment, possible configuration nodes might be removed and new nodes 424 and 428 might be added to finalize the graph 410. The dependencies and links between new nodes and the non-configuration nodes 411-417 of graph 410 may be determined based at least in part on one or more properties of the one or more infrastructure templates and additional information described in conjunction with FIG. 3. As a result, a new example graph 500 may be generated.

Figure 5:
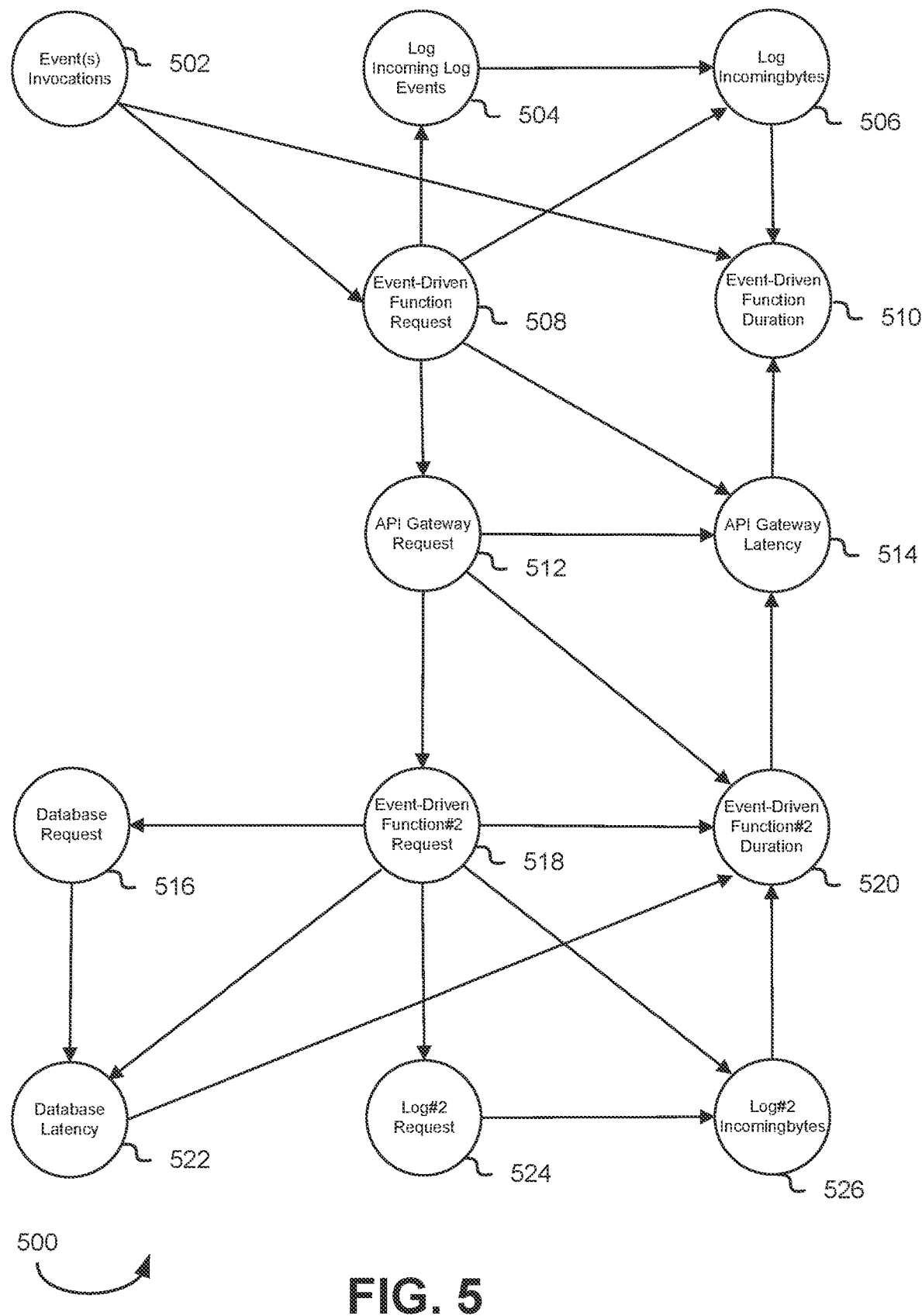
FIG. 5 illustrates an example graph, in accordance with at least one embodiment.

FIG. 5 illustrates an example graph 500 that may include nodes that represent resources and its metric associated with the resource. The example graph 500 may not contain any configuration nodes that represent non-service resource. The example graph 500 shows dependencies between different nodes. For example, request for event-driven function node 508 may depend on invocations for events node 502; incoming log events for log node 504 may depend on the request for event-driven function node 508; incomingbytes for log node 506 may depend on incoming log events for log node 504 and event-driven function node 508; duration for event-driven function node 510 may depend on the invocations for events node 502, incomingbytes for log node 506, and latency for API gateway node 514; latency for API gateway node 514 may depend on the event-driven function node 508 and request for API gateway node 512; request for API gateway node 512 may depend on the request for event-driven function node 508; request for event-driven function node 518 may depend on the request for API gateway node 512; request for database node 516 may depend on the request for event-driven function node 518; latency for database node 522 may depend on the request for event-driven function node 518 and request for database node 516; request for log node 524 may depend on the request for event-driven function node 518; incomingbytes for log node 526 may depend on the request for event-driven function node 518 and the request for log node 524; and duration for event-driven function 520 may depend on the event-driven function node 518, the latency for database node 522, the request for API gateway node 512, and the incomingbytes for log node 526. In various embodiments, the graph 500 may be generated by the anomaly analytics service 170 described in conjunction with FIG. 1.

Figure 6:
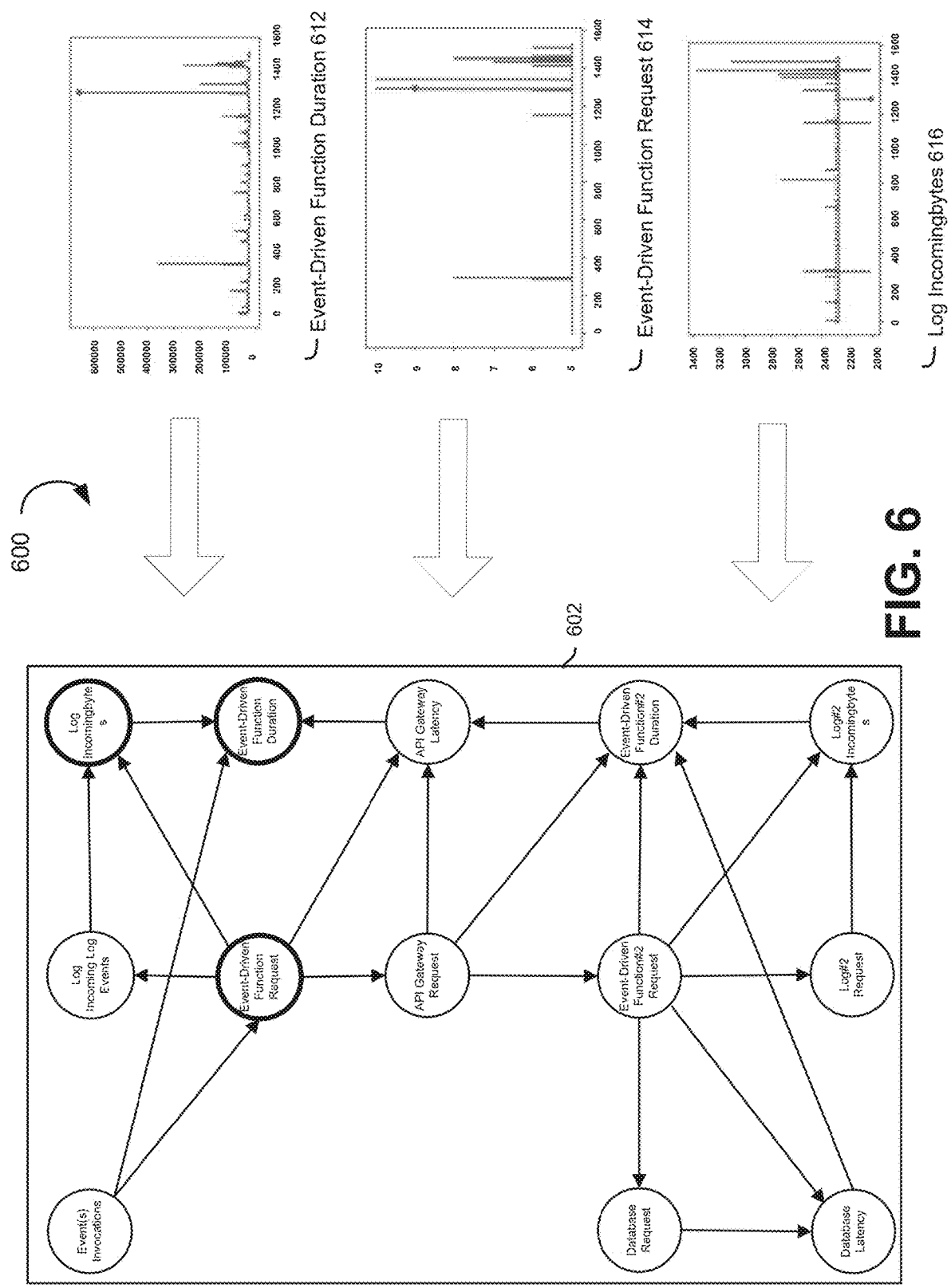
FIG. 6 illustrates an example graph with anomalies, in accordance with at least one embodiment.

FIG. 6 illustrates an example graph 600 with anomalies. The example graph 600 can be the graph 500 described in conjunction with FIG. 5. In one embodiment, time series data is stored in a logical data container offered by on-demand data storage service 130 described in conjunction with FIG. 1. In another embodiment, time series data is received by monitoring service 140 described in conjunction with FIG. 1. The monitoring service 140 collects time series data measured by each operating resource within the infrastructure described in conjunction with FIGS. 1-3. Time series data may include some value(s) accumulated for a customer, such as principal of the computing resource service provider. The time series data and associated value(s) can comprise, but is not limited to, data that describe values of the system's functionalities and resource usage during a particular time series. For example, the time series data may comprise how much CPU was consumed over a certain amount of time, or at a particular instance in time, for a particular entity or resource. Further, the time series data, can be historical data linked to variability, latency, AccountID, metric name, and so forth. Other types of data can be included in the time series metric data. Other types of data can include information about the data (i.e., metadata). The time series data and associated value(s) may be stored in two distinct arrays. One of the arrays can be for the timestamp, and the other array can be for the value that corresponds with the timestamp. The time series array can be always increasing in value. This time series metric data may be exploited for optimization. The time series data can be accumulated or aggregated by many services provided by computing resource service provider. The time series data can be further formatted and optimized.

The time series data indicates anomalies of one or more metrics. For example, time series data of duration for event-driven function 612 indicates an anomaly (a dot) between 1200 and 1440 seconds. Similarly, time series data of requests for event-driven function 614 indicates an anomaly (a dot) between 1200 and 1440 seconds. Also, time series data of incomingbytes for log 616 indicates an anomaly (a dot) between 1200 and 1440 seconds. Such anomaly, which may sometimes be referred to as an outlier, can be a portion of a time series that exhibits an interesting, unusual, atypical, or useful trend, pattern, or value. For example, if a time series represents the number of units of a product sold over time, a period in which the units sold were considerably higher than the average might be considered an anomaly, or outlier. Such patterns can be difficult to detect, particularly because some variations, such as those that occur seasonally or on different times of the week, may be considered normal.

In at least one embodiment, such anomalies can be detected by training one or more machine learning models to perform anomaly detection on input time series. This may sometimes be referred to as point detection, outlier detection, and so forth. The training may also involve automatically select an appropriate type of machine learning model based on analysis of a pattern exhibited in the time series and train the model without input from the user other than the data and other basic information, such as the desired frequency prediction. While training, a subset of a provided time series is used, such as 50% of the data points in a time series, and 50% are reserved for performing inference and identifying anomalies. In some embodiments, the inferencing stage can be performed directly subsequent to the training stage, as part of the training workflow. Various machine learning algorithms and models could include, but are not necessarily limited to, neural networks, decision trees, random forests, support vector machines, and so on. In one embodiment, a back-testing service can be performed such that principal 102 can determine the accuracy of such machine learning algorithms and models. In one embodiment, anomalies from time series data can be detected from either monitoring service 140 or anomaly analytics service 170 described in conjunction with FIG. 1.

In at least one embodiment, all three anomalies from each time series data 612, 614, and 616 may cause nodes that correspond to those time series data 612, 614, and 616 to be marked. The marked nodes in graph 600 can be the focus when determining a root cause anomaly that causes other anomalies that were detected in time series data 612, 614, and 616.

Figure 7:
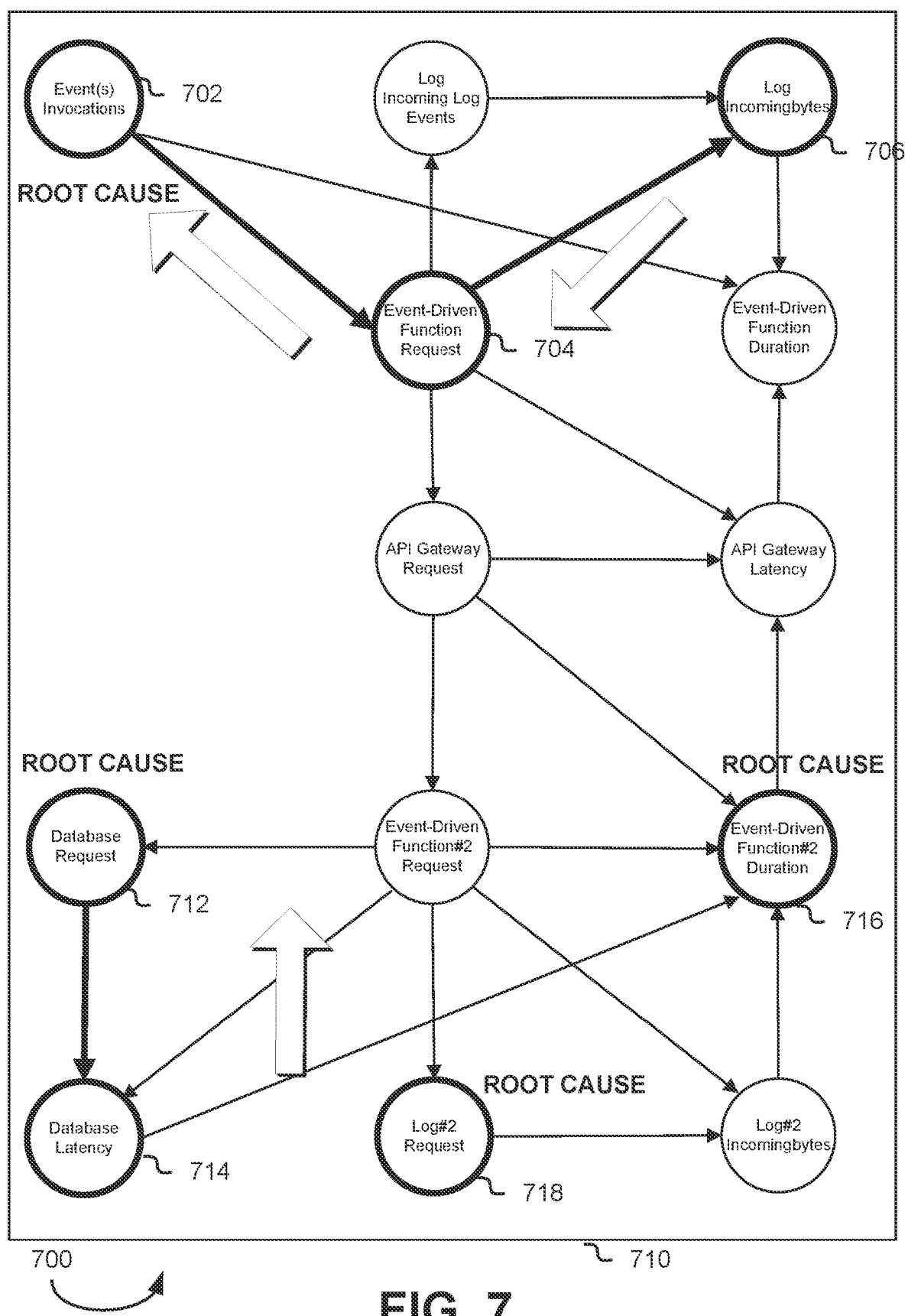
FIG. 7 illustrates an example method of determining root cause anomaly using graph, in accordance with at least one embodiment.

FIG. 7 illustrates an example method 700 of determining root cause anomaly using graph 710. In various embodiments, graph 710 can be graph 600. One algorithm that can be used to determine the root cause anomaly is to traverse nodes within graph 710. Nodes 702, 704, and 706 within graph 710 can be marked as anomalous using time series data and anomaly detection methods described in conjunction with FIGS. 1 and 6. One example application of such algorithm is to traverse nodes that may be marked as anomalous based on the dependencies between the marked nodes 702, 704, and 706. For example, incomingbytes for log node 706 may depend on request for event-driven function node 704 and the event-driven function node 704 may depend on invocations for event node 702. Such algorithm may start from incomingbytes for log node 706 and follows the dependencies and determine that anomalous nodes 704 and 706 depend on anomalous node 702. In other words, invocations for event node 702 is the top anomalous node that other nodes may depend on based at least in part on traversing the dependencies shown in graph 710. Therefore, anomalies detected in the metric invocations of events resource may cause other anomalies within the whole infrastructure that includes all resources and metrics associated with the graph 710.

Alternatively, there could be two or more root cause anomalies determined by such algorithm. For example, if requests for database node 712 and latency for database node 714 is anomalous based at least in part on time series data, such algorithm may traverse both nodes to determine the dependencies between the two nodes. According to the graph 700, the latency for database node 714 may depend on the requests for database node 712, so the requests for database node 712 can be another root cause anomaly. This can be another root cause anomaly because there might be no anomalous nodes that connect between first chain of anomalous nodes (e.g., nodes 702, 704, and 706) and a second chain of anomalous nodes (e.g., nodes 712 and 714). So, two root cause anomalies here contribute to all anomalies detected within such infrastructure.

In at least one embodiment, assuming that all nodes within graph 714 are anomalous, such algorithm can traverse and follow the dependencies of graph 714. Traversing the nodes can start with any nodes within graph 714. There may be multiple start nodes to ensure that the results are consistent by using such algorithm. For example, such algorithm can start with latency for database node 714. Such algorithm may determine which nodes that the latency for database node 714 depends on. Two nodes that the latency for database node 714 may depends on are request for database node 712 and request for event-driven function #2 node. Now the algorithm may determine which nodes that request for database node 712 and request for event-driven function #2 node depends on and the node is request for API gateway node. The algorithm then may determine that the request for API gateway depends on the request for event-driven function node 704. Then, the algorithm may further determine that invocations for events node 702 is what the request for event-driven function node 704 depends on.

Therefore, the invocations for events node 702 becomes the root cause anomaly if all nodes within graph 710 are anomalous. The results may be the same even if the algorithm starts with a different node within graph 710.

In one embodiment, there are anomalous nodes 716 and 718 that are not within a chain dependencies. Such algorithm may determine that both anomalous nodes 716 and 718 are root cause nodes because no anomalous nodes are directly connected to each other. In various embodiments, a first chain of dependencies that connect anomalous nodes 702, 704, and 706, a second chain of dependencies that connect anomalous nodes 712 and 714, and individual root cause nodes 716 and 718 are non-limiting examples. For example, only the first chain of dependencies may exist. Alternatively, only the second chain of dependencies may exist. There might be other chain of dependencies that include anomalous nodes that are not described in FIG. 7.

Figure 8:
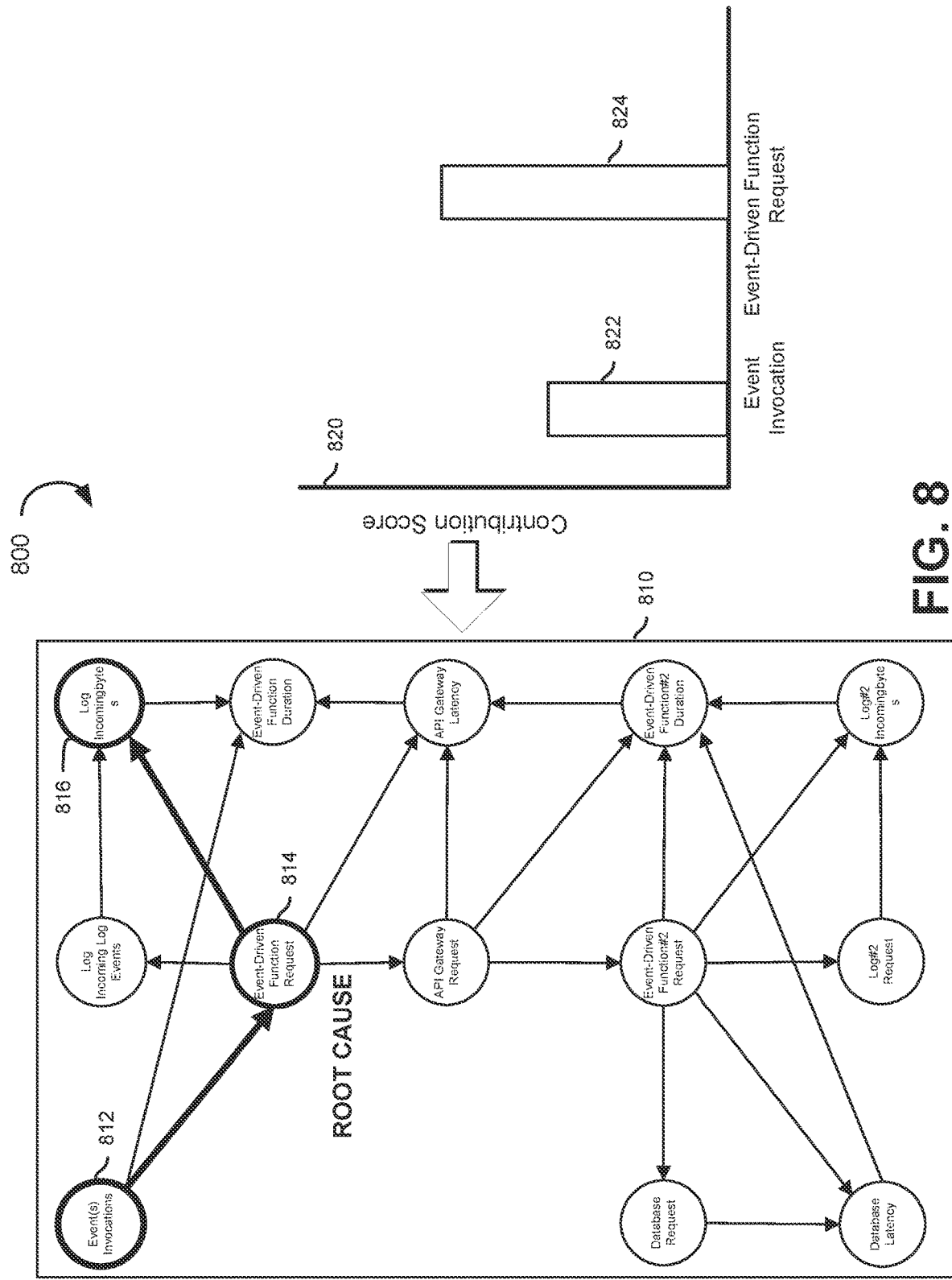
FIG. 8 illustrates an example method of determining root cause anomaly using graph, in accordance with at least one embodiment.

FIG. 8 illustrates an example method 800 of determining root cause anomaly. In various embodiments, graph 810 can be either graph 600 or graph 710. One algorithm that can be used to determine the root cause anomaly is to determine contribution scores of each node and determine that the node that has the highest contribution score is the root cause anomaly. Nodes 812, 814, and 816 within graph 810 may be marked as anomalous using time series data and anomaly detection methods described in conjunction with FIGS. 1 and 6. One example application of such algorithm may be to compare the contribution scores of the nodes 812, 814, and 816 that are marked as anomalous. There might be a chain of dependencies within nodes 812, 814, 816. The contribution score quantifies how resource and metrics of each node contributes to anomalies detected in other nodes. Specifically, for each anomalous nodes 812, 814, and 816, such algorithm determines whether anomalies would not occur if individual anomalous nodes were not anomalous in the first place. For example, if node 816 may depend on node 814 and node 814 may depend on node 812, such algorithm determines how node 814 contributes to the anomaly of nodes 814 and node 816.

In at least one embodiment, contribution score can be a quantification of what extent each anomalous nodes contributed to an anomaly associated with a target node. The target node may include any nodes of the dependency chain except the top node of the dependency chain. The target node can be a sink anomalous node of the anomalous nodes within the chain of dependencies. The sink anomalous node can be an anomalous node that has no descendants. In other words, no anomalous node depends on the sink anomalous node. That is, the sink anomalous node is the last node of the dependency chain of anomalous nodes. For example, node 816 can be the sink anomalous node. Determining the contribution for each node may involve using Shapley values from cooperative game theory that solves the problem of order-dependence by averaging all possible orderings in which elements are excluded. In other words, Shapley contribution of each node is determined to get the contribution score. Also, conditional outlier scores can be used to determine the contribution scores. Conditional outliers are determined by analyzing a casual contribution of each anomalous node to an anomaly associated with the sink anomalous node. This process may involve considering conditionals of each nodes given its parents (nodes that the particular node depends on). This is done by determining an information theoretic outlier score with respect to a conditional distribution. Also, the dependencies that are shown in the graph 810 and one or more time series data that indicates one or more anomalies are used to determine the conditional outlier score. In at least one embodiment, further description of how to calculate the condition score is provided in Dominik Janzing, Kailash Budhathoki, Lenon Minorics, Patrick Blöbaum, "CAUSAL STRUCTURE BASED ROOT CAUSE ANALYSIS OF OUTLIERS," arXiv: 1912.02724, 2019, which is incorporated by reference herein in its entirety.

In at least one embodiment, contribution scores can be different based on timestamps. The timestamps can be based at least in part on multiple time series data. In at least one embodiment, contribution scores with different timestamps can be added to determine the final contribution score of anomalies happened within a certain time frame.

Returning back to the graph 810, the anomalous node with the highest score may be the root cause anomaly. Data 820 may show contribution scores core each anomalous node. According to the data 820, contribution score of requests for event-driven function node 824 may be higher than the contribution score of invocation for events node 822. Therefore, node 814 is the root cause anomaly that causes other anomalies indicated in the graph 810. In one embodiment, the contribution score can be negative and negative contribution scores indicate that an anomaly of a particular node resolves the anomaly associated with the sink anomalous node. For example, if node 814 has a negative contribution score, anomaly associated with the node 814 is mitigating the anomaly associated with node 816.

In various embodiments, multiple contribution scores for each metric/resource-metric pair can be determined depending on different time stamps. For example, for 12:00AM there are multiple anomalies detected on time series data and there are other multiple anomalies detected on the time series data. Alternatively, there can be multiple contribution scores based at least in part on different time series data. There can be one set of contribution scores measured for the 12:00AM anomalies and there can be second set of contribution scores measured for the 12:30AM anomalies. In one embodiment, those sets of contribution scores are initial contribution scores. In another embodiment, the first set of contribution scores and the second set of contribution scores might be added to determine the final contribution scores.

Figure 9:
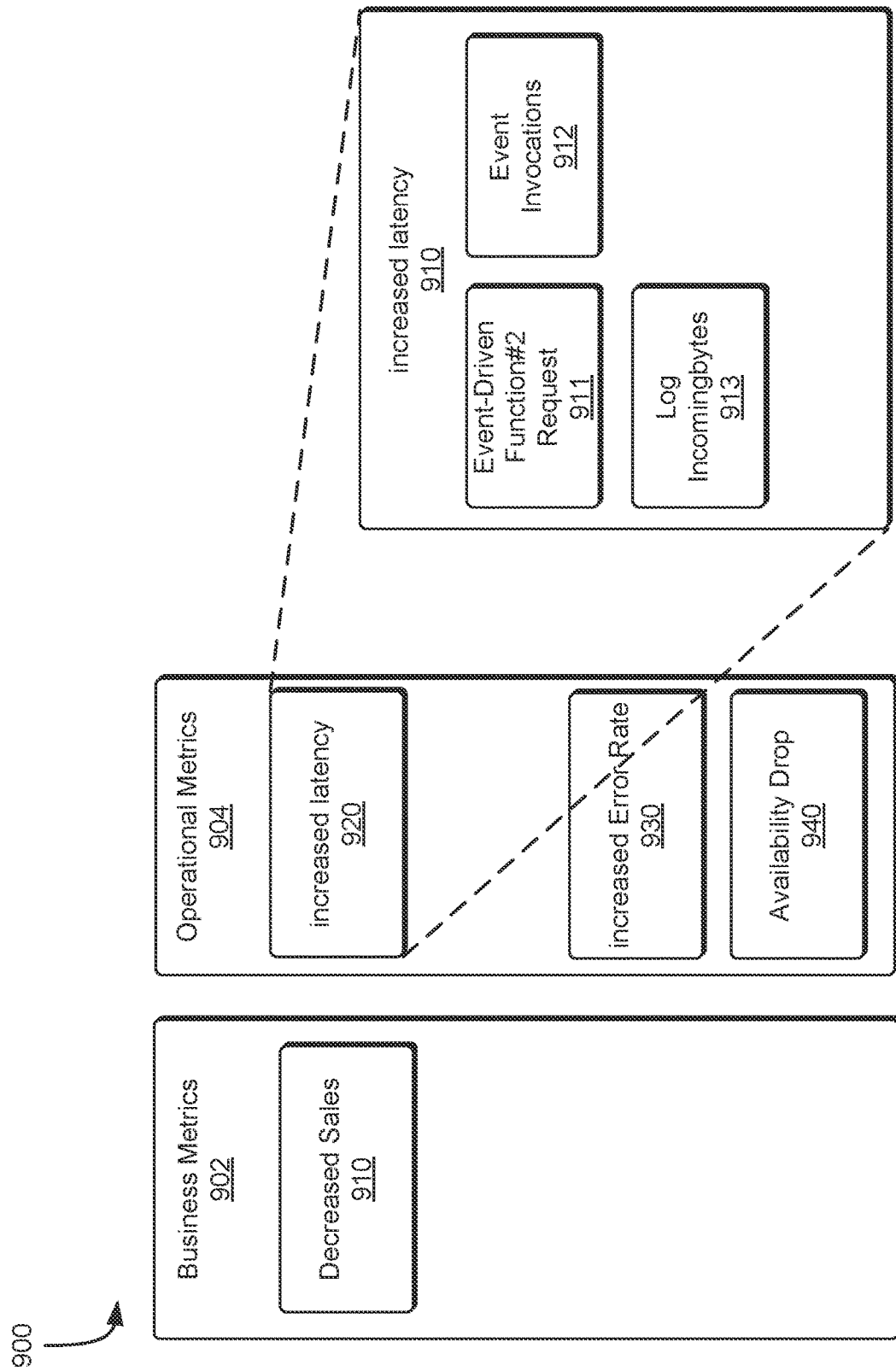
FIG. 9 shows an illustrative example of different recipes within different domains, in accordance with at least one embodiment.

FIG. 9 shows an illustrative example 900 of different recipes within different domains. In at least one embodiment, business metrics 902 and operational metrics 904 belong to different domains. Operational metrics 902 might be related to any kind of metric that is associated with functionality of at least one resource provided by the computing resource service provider. Business metrics 902 can be indicators that measure a business performance. Such business may operate one or more applications on the infrastructure described in conjunction with FIGS. 1-3. One example of a metric that could be part of business metrics is a number of sales or number of customers of the business.

In at least one embodiment, principals of computing resource service provider can define recipes such as decreased sales 910, increased latency 920, increased error rate 930, and availability drop 940. In one embodiment, at least one principal of the principals is principal 102 and the computing resource service provider is the computing resource service provider 110 described in conjunction with FIG. 1. In another embodiment, a first subset of the recipes like decreased sales 910, increased latency 920, increased error rate 930, and availability drop 940 are defined by the principal and second subset of the recipes can be defined by a service provided by the computing resource service provider. One example of the service can be anomaly analytics service 170 described in conjunction with FIG. 1.

Defining recipes include grouping one or more metrics that are associated with a particular resource. For example, increased latency recipes 910 may include a request metric that is associated with the event-driven function resource 911, invocations metric that is associated with events resource 912, and incomingbytes metric associated with the log resource 913. Each recipe can have different combinations of metric and resource pair. For example, increased latency 920 recipes may have different combinations compared to increased error rate recipe 930. Still, each recipe can include at least one metric and resource pair.

In at least one embodiment, anomalies can be detected on an infrastructure and one or more recipes can be flagged. Time series data can be used to indicate anomalies. For example, increased latency recipe 920 has been flagged and anomalies have been detected in at least one metric and resource pair within the increased latency recipes 920. So, at least one metric and resource pair can be flagged as well. Not all metric and resource pairs can be flagged when the increased latency recipes 920 has been flagged. Services like anomaly detection service can determine one or more root causes of the increased latency recipes 920 by generating a graph and using one or more algorithms to determine the one or more root causes. If all metric and resource pairs, such as the request metric that is associated with the event-driven function resource 911, invocations metric that is associated with events resource 912, and incomingbytes metric associated with the log resource 913 are flagged, then the service uses the nodes in the graph that corresponds to those metric and resource pairs to determine one or more root cause anomalies.

Figure 10:
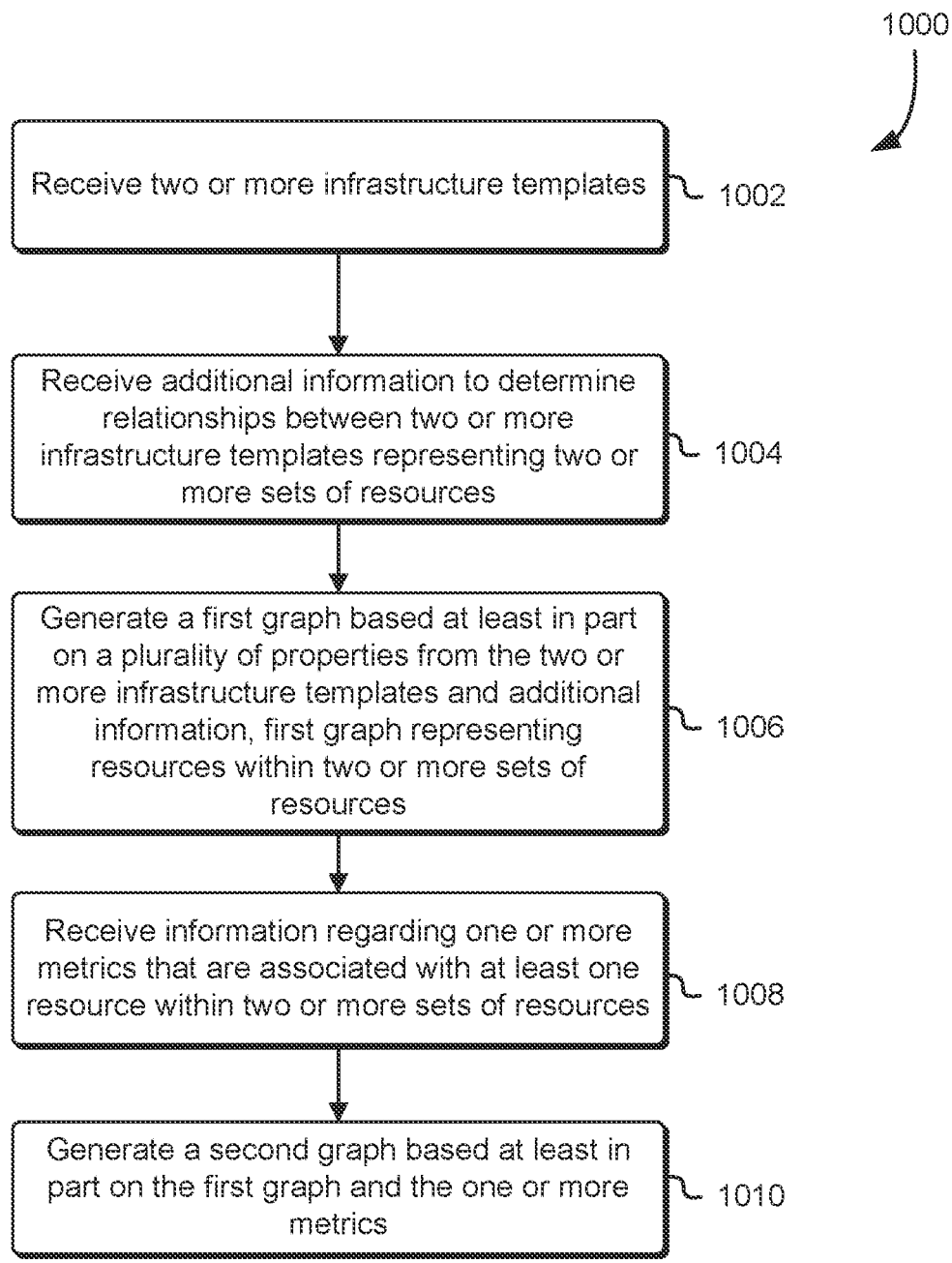
FIG. 10 shows an illustrative example of a process to generate a graph, in accordance with at least one embodiment.

FIG. 10 shows an illustrative example of a process 100 to generate a graph, in accordance with at least one embodiment. Although FIG. 10 is depicted as a series of steps or operations, embodiments may, except where explicitly stated or logically required, alter the order of the depicted steps or operations, perform the depicted steps or operations in parallel, or omit certain steps, while remaining within the scope of the present disclosure. The example process 1000 may be embodied in any of a variety of systems, including but not limited to the example system 100 or example system 1600 depicted in FIGS. 1 and 16. In some embodiments, these steps are performed by a cloud computer system. Some or all of process 1000 (or any other processes described herein, or variations and/or combinations thereof) can be performed under control of one or more computer systems configured with computer-executable instructions and can be implemented as code (e.g., computer-executable instructions, one or more computer programs, or one or more applications) executing collectively on one or more processors, by hardware, software, or combinations thereof. Code can be stored on a computer-readable storage medium in form of a computer program comprising a plurality of computer-readable instructions executable by one or more processors. A computer-readable storage medium can be a non-transitory computer-readable storage medium. At least some computer-readable instructions usable to perform process 1000 cannot be stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals.

At 1002, the system may receive two or more infrastructure templates. Such infrastructure template includes one or more properties of one or more resources of a set of resources. In one embodiment, each infrastructure template may represent each set of resources. The set of resources constitute an application stack provided by the computing resource service provider 110 described in conjunction with FIG. 1. The set of resources can include computing resources that may be provided by the computing resource service provider 110. Example computing resources may include, without limitation, event-driven compute service, log service, database service, API gateway service, on-demand data storage service, monitoring service, infrastructure deployment service, and policy management service. In one embodiment, the two or more infrastructure templates can be generated in response to an API call from principals. In another embodiment, the two or more infrastructure templates can be generated by infrastructure deployment service 150 described in conjunction with FIG. 1.

At 1004, the system receives additional information to determine relationships between two or more infrastructure templates representing two or more sets of resources. In one embodiment, the additional information includes policies that are determined by policy management service 160 described in conjunction with FIG. 1. Such policies may include roles and/or permissions that define the relationships between resources within two or more set of resources represented by the two or more infrastructure templates. For example, going back to FIG. 2. For example, resource A having a role or permission to access resource B may indicate a relationship between resource A and resource B. In one embodiment, additional information may include information of one resource subscribing another resource.

At 1006, the system may generate a first graph based at least in part on a plurality of properties from the two or more infrastructure templates and additional information. Each node of the first graph may represent/correspond to a resource. Links and/or dependencies of the first graph may be determined based at least in part on the two or more properties listed on the two or more infrastructure templates and additional information. For example, properties within a template may define links or dependencies between resources within a set of resources and additional information may define links or dependencies between one resource within a first set of resource and another resource within a second set of resources. One node of the first graph is only connected with another node of the first graph. Different nodes can be connected with multiple nodes of the first graph. In one embodiment, generating a first graph may include deleting configuration nodes that help determine dependencies between nodes, but merely represents a non-service resource.

At 1008, the system may receive information regarding one or more metrics that are associated with at least one resource within two or more sets of resources. In at least one embodiment, each resource of the two or more sets of resources may be associated with at least one metric because the resource is a service resource. In one example, one resource could be associated with just one resource, and another resource could be associated with more than one resource. The metrics data could be received by performing one or more API calls to query metrics data associated with the resource. In another embodiment, metrics data can be obtained from a monitoring service 140 described in conjunction with FIG. 1.

At 1010, the system may generate a second graph based at least in part on the first graph and the one or more metrics. First, the system may create nodes for each metric associated with the resource. If there are 3 metrics that are associated with a resource, then the system may generate three nodes that correspond to the metric-resource pair. After creating additional nodes by parsing all the metrics, the system may link all the nodes to generate the second graph. The second graph may include nodes that represent metric-resource pair and dependency between such nodes.

Figure 11:
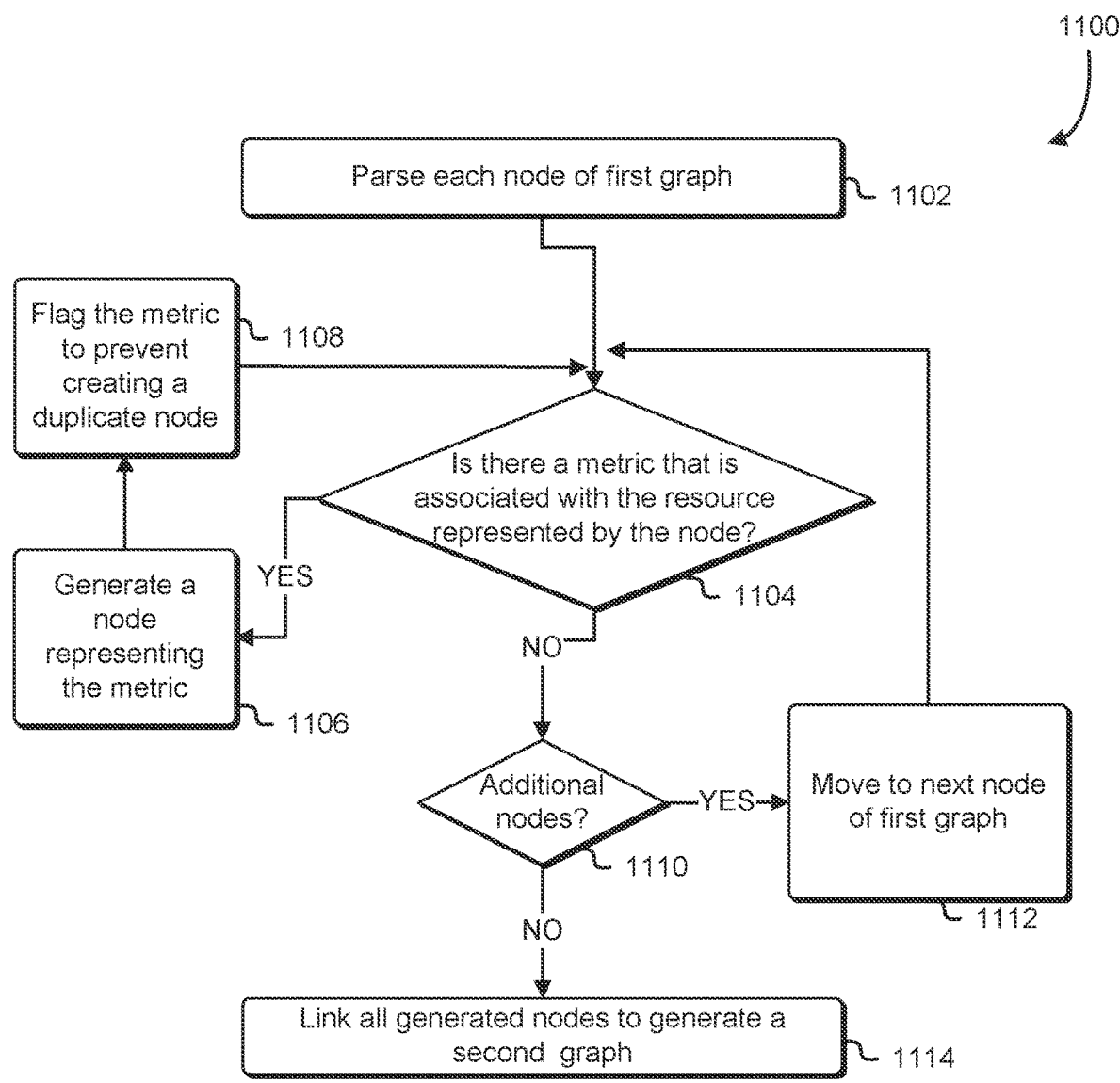
FIG. 11 shows an illustrative example of a process to generate a graph, in accordance with at least one embodiment.

FIG. 11 shows an illustrative example of a process 1100 to generate a graph, in accordance with at least one embodiment. Although FIG. 11 is depicted as a series of steps or operations, embodiments may, except where explicitly stated or logically required, alter the order of the depicted steps or operations, perform the depicted steps or operations in parallel, or omit certain steps, while remaining within the scope of the present disclosure. The example process 1100 may be embodied in any of a variety of systems, including but not limited to the example system 100 or example computing environment 1600 depicted in FIGS. 1 and 16. In some embodiments, these steps are performed by a cloud computer system. Some or all of process 1100 (or any other processes described herein, or variations and/or combinations thereof) can be performed under control of one or more computer systems configured with computer-executable instructions and can be implemented as code (e.g., computer-executable instructions, one or more computer programs, or one or more applications) executing collectively on one or more processors, by hardware, software, or combinations thereof. Code can be stored on a computer-readable storage medium in form of a computer program comprising a plurality of computer-readable instructions executable by one or more processors. A computer-readable storage medium can be a non-transitory computer-readable storage medium. At least some computer-readable instructions usable to perform process 1100 cannot be stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals.

At 1102, the system may parse each node of the first graph that represents resources described in two or more infrastructure templates. In various embodiments, the first graph can be the first graph described in conjunction with FIG. 10. Each node of the first graph represents each resource described in two or more infrastructure templates. Each infrastructure templates may represent a set of resources or an application stack that is deployed by a virtual private cloud service provided by a computing resource service provider.

At 1104, the system may determine whether a metric that is associated with each node. In one embodiment, such nodes do not include configuration nodes that represent non-service computing resources. There can be at least one metric that is associated with each resource represented by each node. If there is a metric that is associated with the resource represented by the node, the process 1100 can move to 1106. Alternatively, if all the metric has been identified, the process 1100 can move to 1110.

At 1106, the system may generate a new node representing the metric associated with the resource represented by the parsed node. The new node now represents a resource-metric pair.

At 1108, the system may flag the metric such that additional nodes are not created to represent the specific resource-metric pair. After flagging the metric, the process 1100 may returns to 1104 to determine if there are additional metrics that are associated with a particular resource represented by the parsed node.

At 1110, the system may determine if there are additional nodes to check resources associated with the additional nodes. If there are additional nodes to check, the process 1100 may move to 1112. Otherwise, the process may move to 1114.

At 1112, the system may move on to the next node the repeat 1104 with the next node.

At 1114, the system may link all generated nodes to generate a second graph. All nodes within the second graph may represent each resource-metric pair. In one embodiment, nodes that only represent resources in the first graph and its dependency information may be used to generate the second graph. Additionally, metrics data, additional information such as policy information, and properties from the infrastructure templates may be used to generate the second graph.

Figure 12:
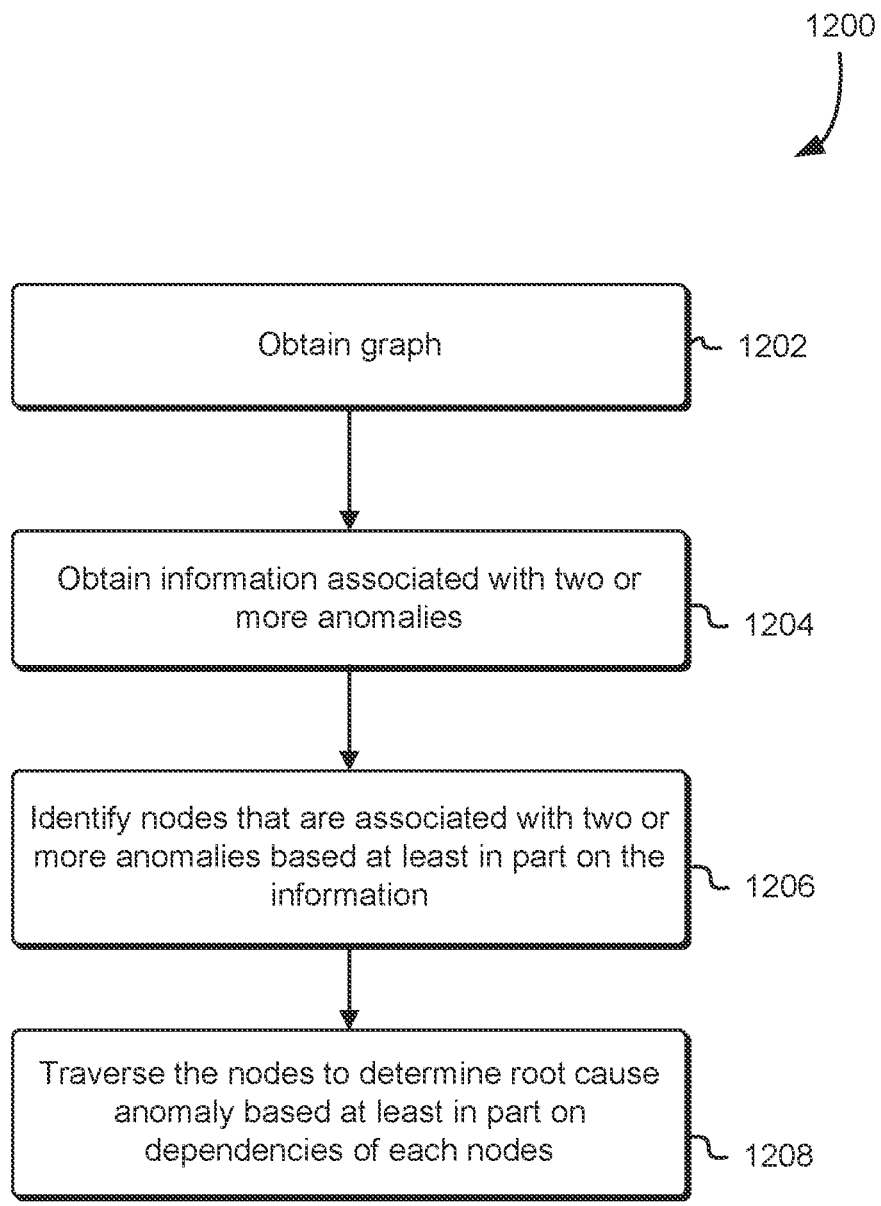
FIG. 12 shows an illustrative example of a process to identify root cause anomaly, in accordance with at least one embodiment.

FIG. 12 shows an illustrative example of a process to identify root cause anomaly, in accordance with at least one embodiment. Although FIG. 12 is depicted as a series of steps or operations, embodiments may, except where explicitly stated or logically required, alter the order of the depicted steps or operations, perform the depicted steps or operations in parallel, or omit certain steps, while remaining within the scope of the present disclosure. The example process 1200 may be embodied in any of a variety of systems, including but not limited to the example system 100 or example computing environment 1600 depicted in FIGS. 1 and 16. In some embodiments, these steps are performed by a cloud computer system. Some or all of process 1200 (or any other processes described herein, or variations and/or combinations thereof) can be performed under control of one or more computer systems configured with computer-executable instructions and can be implemented as code (e.g., computer-executable instructions, one or more computer programs, or one or more applications) executing collectively on one or more processors, by hardware, software, or combinations thereof. Code can be stored on a computer-readable storage medium in form of a computer program comprising a plurality of computer-readable instructions executable by one or more processors. A computer-readable storage medium can be a non-transitory computer-readable storage medium. At least some computer-readable instructions usable to perform process 1200 cannot be stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals.

At 1202, the system may obtain a graph. In one embodiment, the system can generate a graph that is described in conjunction with FIG. 5 or a second graph that is described in conjunction with FIGS. 10-11. In another embodiment, the system can receive the graph generated by a service provided by a computing resource service provider. Alternatively, the system can receive a graph generated by an anomaly analytics module 1610 described in conjunction with FIG. 16. The graph may represent each resource-metric pair, where each resource is from two or more sets of resources defined by an infrastructure template provided by the computing resource service provider or a principal. Each resource may be associated with one or more metrics and there may be multiple nodes that represent that the resource-metric pair based on the association.

At 1204, the system may obtain information associated with two or more anomalies. The system receives time series data that indicates anomalies. Time series data may include some value(s) accumulated for a customer, such as principal of the computing resource service provider. The time series data and associated value(s) can comprise, but is not limited to, data that describe values of the system's functionalities and resource usage during a particular time series. For example, the time series data may comprise how much CPU was consumed over a certain amount of time, or at a particular instance in time, for a particular entity or resource. Further, the time series data, can be historical data linked to variability, latency, AccountID, metric name, and so forth. Other types of data can be included in the time series metric data. Other types of data can include information about the data (i.e., metadata). The time series data and associated value(s) may be stored in two distinct arrays. One of the arrays can be for the timestamp, and the other array can be for the value that corresponds with the timestamp. The time series array can be always increasing in value. This time series metric data may be exploited for optimization. The time series data can be accumulated or aggregated by many services provided by computing resource service provider. The time series data can be further formatted and optimized. An anomaly, which may sometimes be referred to as an outlier, might be a portion of a time series that exhibits an interesting, unusual, atypical, or useful trend, pattern, or value. For example, if a time series represents the number of units of a product sold over time, a period in which the units sold were considerably higher than the average might be considered an anomaly, or outlier. Such patterns can be difficult to detect, particularly because some variations, such as those that occur seasonally or on different times of the week, may be considered normal. Time series data can be received through a monitoring service and anomalies can be detected using the same service or using a different service that uses one or more machine learning models to detect anomalies within the time series data.

At 1206, the system may identify nodes that are associated with two or more anomalies based at least in part on the information. The time series data may indicate anomalies associated with the metric-resource pair. By using the time series data, the system may mark nodes that are anomalous and those anomalous nodes will be used to determine the root cause anomaly.

At 1208, the system may traverse the nodes to determine root cause anomaly based at least in part on dependencies of each node. The system can use an algorithm described in conjunction with FIG. 5. The graph may include one or more chains of anomalous nodes based on dependencies and the system uses the algorithm to traverse each chain of anomalous nodes to determine the top node that the nodes of the chain of anomalous nodes depend on. For example, if node A depends on node B and node B depends on node C, there is a chain of nodes (C=>B=>A) that the system traverses and the system determine that node C is the root cause anomaly. In one embodiment, there could be multiple chain of anomalous nodes (e.g., C=>B=>A and E=>F) and the system can determine that both node C and node E is the two root cause anomalies. In another embodiment, if all nodes within the graph are anomalous, the system may determine one root cause anomaly by traversing every single node within the graph.

Figure 13:
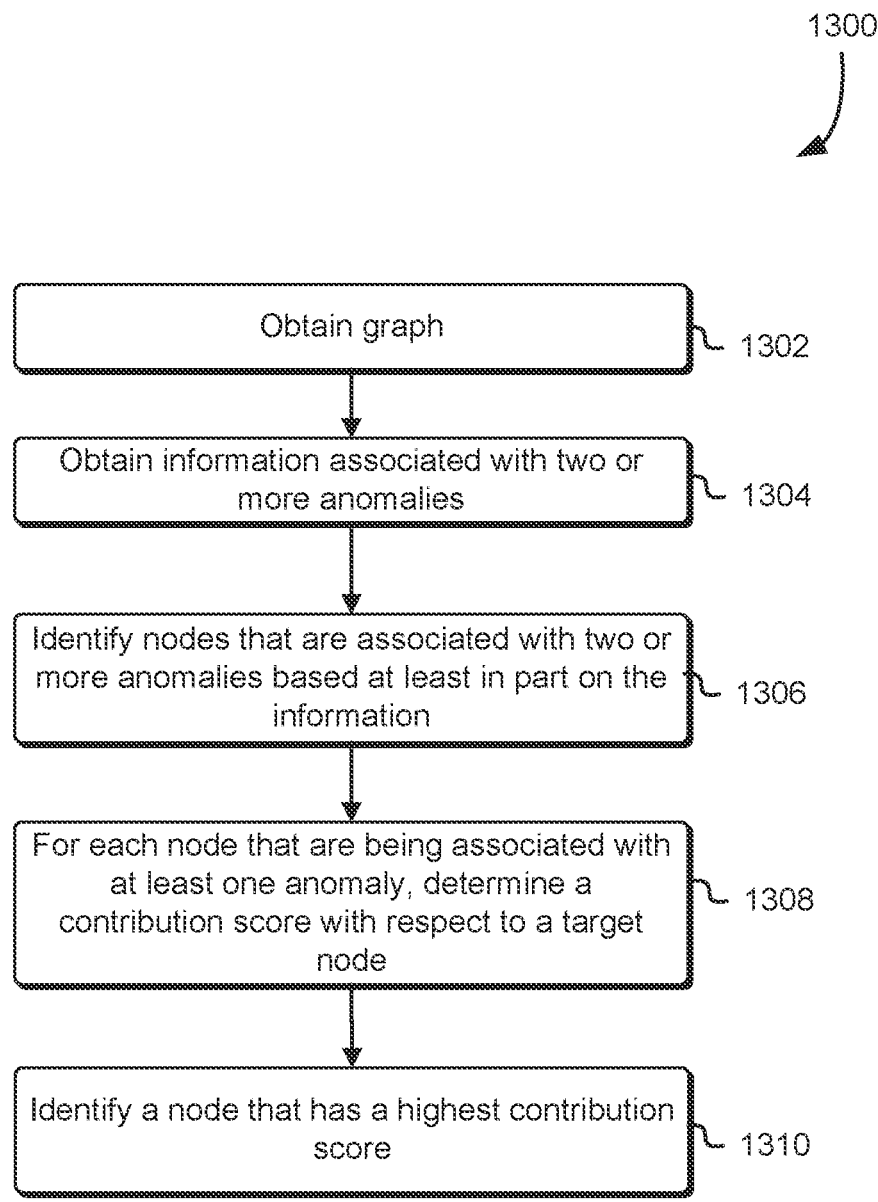
FIG. 13 shows an illustrative example of a process to identify root cause anomaly, in accordance with at least one embodiment.

FIG. 13 shows an illustrative example of a process to identify root cause anomaly, in accordance with at least one embodiment. Although FIG. 13 is depicted as a series of steps or operations, embodiments may, except where explicitly stated or logically required, alter the order of the depicted steps or operations, perform the depicted steps or operations in parallel, or omit certain steps, while remaining within the scope of the present disclosure. The example process 1300 may be embodied in any of a variety of systems, including but not limited to the example system 100 or example computing environment 1600 depicted in FIGS. 1 and 16. In some embodiments, these steps are performed by a cloud computer system. Some or all of process 1300 (or any other processes described herein, or variations and/or combinations thereof) can be performed under control of one or more computer systems configured with computer-executable instructions and can be implemented as code (e.g., computer-executable instructions, one or more computer programs, or one or more applications) executing collectively on one or more processors, by hardware, software, or combinations thereof. Code can be stored on a computer-readable storage medium in form of a computer program comprising a plurality of computer-readable instructions executable by one or more processors. A computer-readable storage medium can be a non-transitory computer-readable storage medium. At least some computer-readable instructions usable to perform process 1300 cannot be stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals.

At 1302, the system may obtain a graph. In one embodiment, the system can generate a graph that is described in conjunction with FIG. 5 or a second graph that is described in conjunction with FIGS. 10-11. In another embodiment, the system can receive the graph generated by a service provided by a computing resource service provider. Alternatively, the system can receive a graph generated by an anomaly analytics module 1610 described in conjunction with FIG. 16. The graph may represent each resource-metric pair, where each resource is from two or more sets of resources defined by an infrastructure template provided by the computing resource service provider or a principal. Each resource is associated with one or more metrics and there are multiple nodes that represent that the resource-metric pair based on the association.

At 1304, the system may obtain information associated with two or more anomalies. The system receives time series data that indicates anomalies. Time series data may include some value(s) accumulated for a customer, such as principal of the computing resource service provider. The time series data and associated value(s) can comprise, but is not limited to, data that describe values of the system's functionalities and resource usage during a particular time series. For example, the time series data may comprise how much CPU was consumed over a certain amount of time, or at a particular instance in time, for a particular entity or resource. Further, the time series data, can be historical data linked to variability, latency, AccountID, metric name, and so forth. Other types of data can be included in the time series metric data. Other types of data can include information about the data (i.e., metadata). The time series data and associated value(s) may be stored in two distinct arrays. One of the arrays can be for the timestamp, and the other array can be for the value that corresponds with the timestamp. The time series array can be always increasing in value. This time series metric data may be exploited for optimization. The time series data can be accumulated or aggregated by many services provided by computing resource service provider. The time series data can be further formatted and optimized. An anomaly, which may sometimes be referred to as an outlier, is a portion of a time series that exhibits an interesting, unusual, atypical, or useful trend, pattern, or value. For example, if a time series represents the number of units of a product sold over time, a period in which the units sold were considerably higher than the average might be considered an anomaly, or outlier. Such patterns can be difficult to detect, particularly because some variations, such as those that occur seasonally or on different times of the week, may be considered normal. Time series data can be received through a monitoring service and anomalies can be detected using the same service or using a different service that uses one or more machine learning models to detect anomalies within the time series data.

At 1306, the system may identify nodes that are associated with two or more anomalies based at least in part on the information. The time series data may indicate anomalies associated with the metric-resource pair. By using the time series data, the system may mark nodes that are anomalous and those anomalous nodes will be used to determine the root cause anomaly.

At 1308, the system may determine a contribution score for each of the anomalous nodes. First, the system may determine a target node. The target node can be an anomalous node among other anomalous node within the chain of dependencies and one example is a sink anomalous node. The sink anomalous node can be an anomalous node that has no descendants meaning that no anomalous node may depend on the sink anomalous node. In other words, the sink anomalous node may be the last or the bottom node of the dependency chain of anomalous nodes. For example, if anomalous node A depends on anomalous node B and anomalous node B depends on anomalous node C, then A may be the sink anomalous node. The dependency chain of anomalous nodes may be determined based at least in part on dependencies of the whole graph node described in conjunction with FIG. 5. Determining the contribution score for each nodes except the sink anomalous nodes is described in conjunction with FIG. 8. In one embodiment, the contribution score can be negative and negative contribution scores indicate that an anomaly of a particular node resolves the anomaly associated with the sink anomalous node. For example, if anomalous node B has a negative contribution score, anomaly associated with the anomalous node B may mitigate the anomaly associated with anomalous node C.

At 1310, the system may determine that the anomalous node with the highest contribution score has the root cause anomaly. In one embodiment, the root cause anomaly determined by process 1300 may not be the same as the root cause anomaly determined by process 1200 described in conjunction with FIG. 12. Alternatively, the root cause anomaly determined by process 1300 may be the same as the root cause anomaly determined by process 1200 described in conjunction with FIG. 12.

Figure 14:
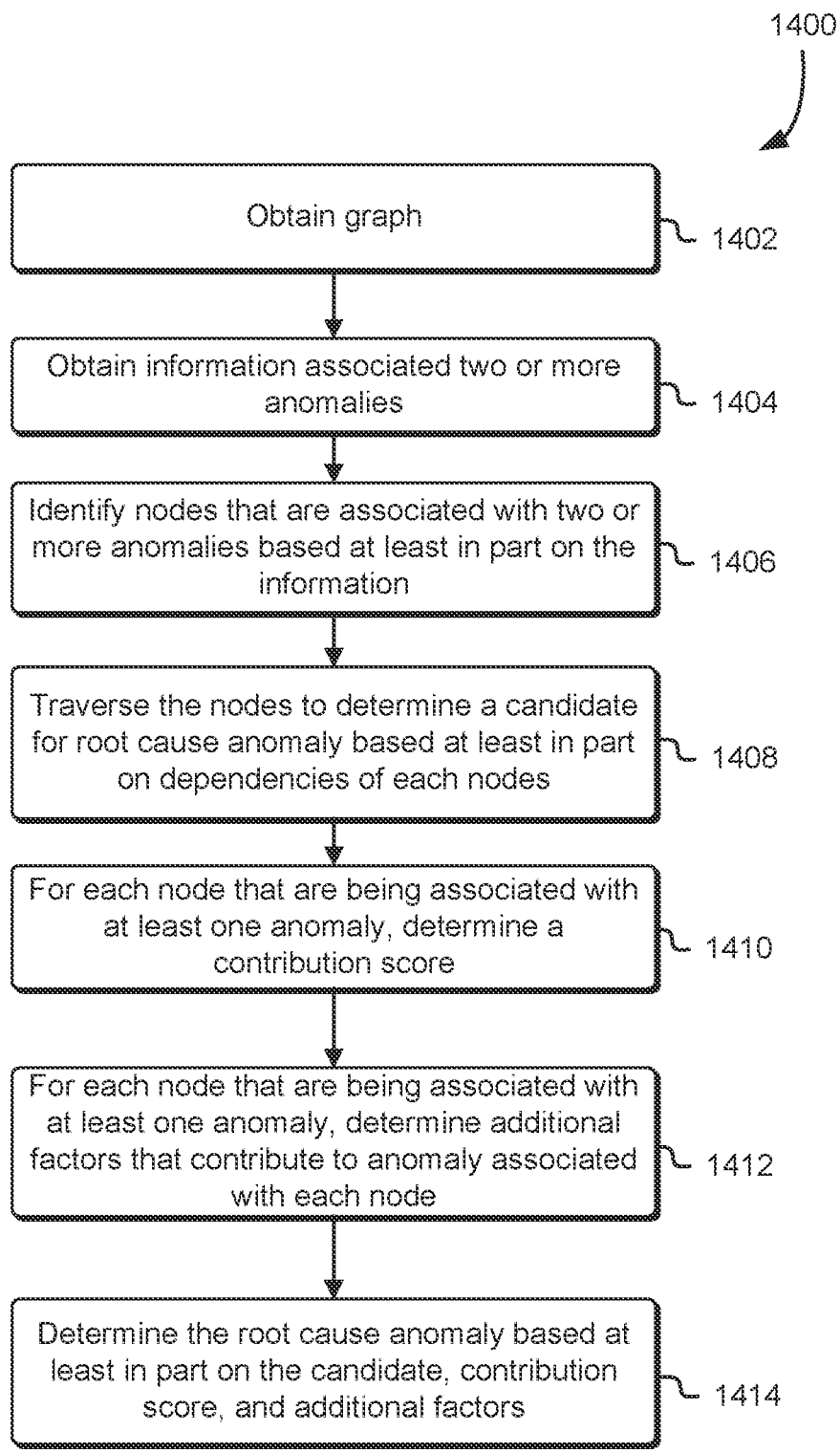
FIG. 14 shows an illustrative example of a process to identify root cause anomaly, in accordance with at least one embodiment.

FIG. 14 shows an illustrative example of a process to identify root cause anomaly, in accordance with at least one embodiment. Although FIG. 14 is depicted as a series of steps or operations, embodiments may, except where explicitly stated or logically required, alter the order of the depicted steps or operations, perform the depicted steps or operations in parallel, or omit certain steps, while remaining within the scope of the present disclosure. The example process 1400 may be embodied in any of a variety of systems, including but not limited to the example system 100 or example computing environment 1600 depicted in FIGS. 1 and 16. In some embodiments, these steps are performed by a cloud computer system.

Some or all of process 1400 (or any other processes described herein, or variations and/or combinations thereof) can be performed under control of one or more computer systems configured with computer-executable instructions and can be implemented as code (e.g., computer-executable instructions, one or more computer programs, or one or more applications) executing collectively on one or more processors, by hardware, software, or combinations thereof. Code can be stored on a computer-readable storage medium in form of a computer program comprising a plurality of computer-readable instructions executable by one or more processors. A computer-readable storage medium can be a non-transitory computer-readable storage medium. At least some computer-readable instructions usable to perform process 1400 cannot be stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals.

At 1402, the system may obtain a graph. In one embodiment, the system can generate a graph that is described in conjunction with FIG. 5 or a second graph that is described in conjunction with FIGS. 10-11. In another embodiment, the system can receive the graph generated by a service provided by a computing resource service provider. Alternatively, the system can receive a graph generated by an anomaly analytics module 1610 described in conjunction with FIG. 16. The graph may represent each resource-metric pair, where each resource is from two or more sets of resources defined by an infrastructure template provided by the computing resource service provider or a principal. Each resource is associated with one or more metrics and there are multiple nodes that represent that the resource-metric pair based on the association.

At 1404, the system may obtain information associated with two or more anomalies. The system may receive time series data that indicates anomalies. Time series data may include some value(s) accumulated for a customer, such as principal of the computing resource service provider. The time series data and associated value(s) can comprise, but is not limited to, data that describe values of the system's functionalities and resource usage during a particular time series. For example, the time series data may comprise how much CPU was consumed over a certain amount of time, or at a particular instance in time, for a particular entity or resource. Further, the time series data, can be historical data linked to variability, latency, AccountID, metric name, and so forth. Other types of data can be included in the time series metric data. Other types of data can include information about the data (i.e., metadata). The time series data and associated value(s) may be stored in two distinct arrays. One of the arrays can be for the timestamp, and the other array can be for the value that corresponds with the timestamp. The time series array can be always increasing in value. This time series metric data may be exploited for optimization. The time series data can be accumulated or aggregated by many services provided by computing resource service provider. The time series data can be further formatted and optimized. An anomaly, which may sometimes be referred to as an outlier, is a portion of a time series that exhibits an interesting, unusual, atypical, or useful trend, pattern, or value. For example, if a time series represents the number of units of a product sold over time, a period in which the units sold were considerably higher than the average might be considered an anomaly, or outlier. Such patterns can be difficult to detect, particularly because some variations, such as those that occur seasonally or on different times of the week, may be considered normal. Time series data can be received through a monitoring service and anomalies can be detected using the same service or using a different service that uses one or more machine learning models to detect anomalies within the time series data.

At 1406, the system may identify nodes that are associated with two or more anomalies based at least in part on the information. The time series data indicate anomalies associated with the metric-resource pair. By using the time series data, the system marks nodes that are anomalous and those anomalous nodes will be used to determine the root cause anomaly.

At 1408, the system may traverse the nodes to determine a candidate for root cause anomaly based at least in part on the dependencies of each node. In one embodiment, the traversing algorithm can be the algorithm described in conjunction with FIG. 7. The graph may include one or more chains of anomalous nodes based on dependencies and the system uses the algorithm to traverse each chain of anomalous nodes to determine the top node that the nodes of the chain of anomalous nodes depend on. For example, if node A depends on node B and node B depends on node C, there is a chain of nodes (C=>B=>A) that the system traverses and the system determine that node C is the root cause anomaly. In another embodiment, if all nodes within the graph are anomalous, the system determines one root cause anomaly by traversing every single node within the graph.

At 1410, the system may determine a contribution score for each node are being associated with at least one anomaly. First the system determines the anomalous node that is a sink anomalous node. The sink anomalous node can be an anomalous node that has no descendants meaning that no anomalous node depends on the sink anomalous node. In other words, the sink anomalous node may be the last node of the dependency chain of anomalous nodes. For example, if anomalous node A depends on anomalous node B and anomalous node B depends on anomalous node C, then A may be the sink anomalous node. Determining the contribution score for each node except the sink anomalous nodes is described in conjunction with FIG. 8. In one embodiment, the contribution score can be negative and negative contribution scores indicate that an anomaly of a particular node resolves the anomaly associated with the sink anomalous node. For example, if anomalous node B has a negative contribution score, anomaly associated with the anomalous node B may mitigate or resolve the anomaly associated with anomalous node C.

At 1412, the system may determine additional factors that contribute to anomaly associated with each node. Additional factors may include analyzing the resource-metric pair represented by anomalous nodes to see how the anomaly in the resource-metric pair is contributing to other anomalous nodes without looking at the dependencies of dependency chain of anomalous nodes. In other words, additional factors may only look at a particular node to see how the particular node is contributing to any other anomalies occurred in the infrastructure that contains all resources. This simply determines how much of the anomaly of the nodes cannot be explained by the system (e.g., graph) itself. In one embodiment, this additional factor can be measured for the sink anomalous node. Methods that are to determine those additional factors are provided in Dominik Janzing, Kailash Budhathoki, Lenon Minorics, Patrick Blöbaum, "CAUSAL STRUCTURE BASED ROOT CAUSE ANALYSIS OF OUTLIERS," arXiv: 1912.02724, 2019, which is incorporated by reference herein in its entirety.

At 1414, the system may determine the root cause anomaly based at least in part on the candidate, contribution score and additional factors. Alternatively, the root cause anomaly can be determined based on a subset of the candidate, contribution score and additional factors. For example, the root cause anomaly can be determined based on the candidate and the contribution score. The contribution score may confirm that the candidate is the correct root cause. Conversely, the contribution score may indicate that other anomalous nodes in the dependency chain of anomalous nodes have a higher contribution score. In one example, the root cause anomaly can be determined based on the candidate and additional factors. The additional factor may indicate that a particular anomalous node should be the root cause despite having the candidate. In another example, the root cause anomaly can be determined based on the contribution score and additional factors. Alternatively, such determinations to consider what measures to consider while determining the root cause anomaly can be based on calculating robustness of the time series data. Calculating the robustness of the time series data can be determining the number of data points that are provided by the time series data, number of anomalies detected within the time series data, how accurate the detected anomalies in the time series data are. For example, if the system determines that the time series data is less robust, the system may give more weight on the candidate rather than the contribution scores.

Figure 15:
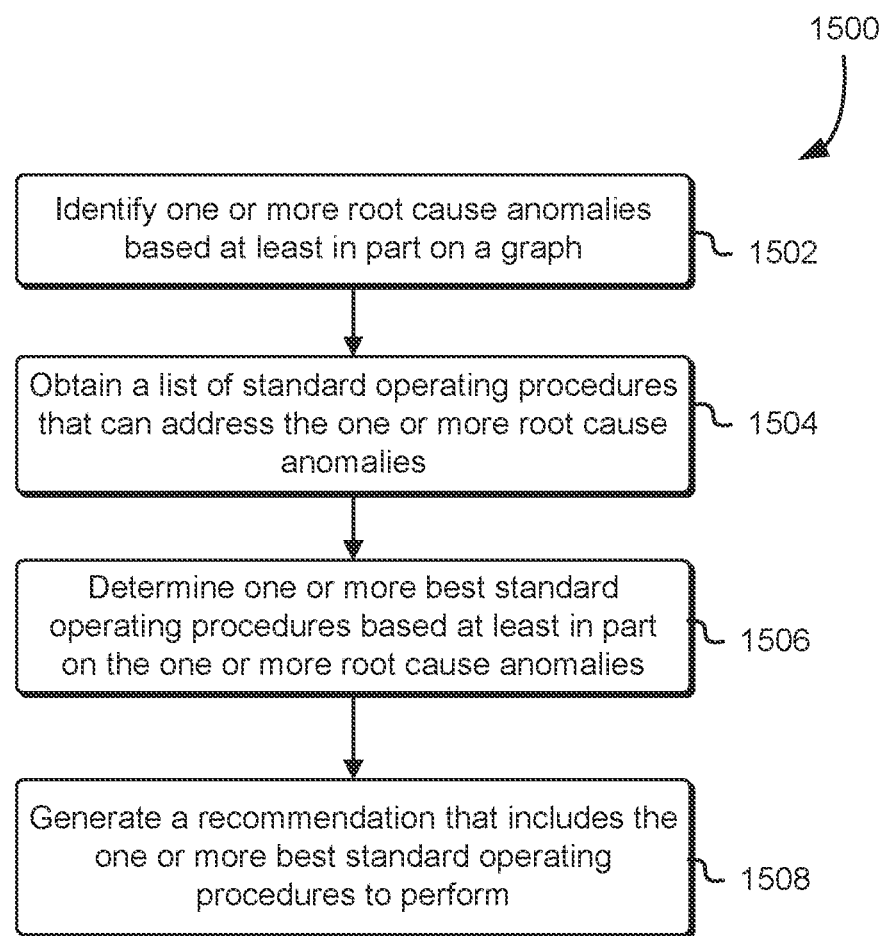
FIG. 15 shows an illustrative example of a process to provide recommendations using root cause anomaly, in accordance with at least one embodiment.

FIG. 15 shows an illustrative example of a process to provide recommendations using root cause anomaly, in accordance with at least one embodiment. Although FIG. 15 is depicted as a series of steps or operations, embodiments may, except where explicitly stated or logically required, alter the order of the depicted steps or operations, perform the depicted steps or operations in parallel, or omit certain steps, while remaining within the scope of the present disclosure. The example process 1500 may be embodied in any of a variety of systems, including but not limited to the example system 100 or example computing environment 1600 depicted in FIGS. 1 and 16. In some embodiments, these steps are performed by a cloud computer system. Some or all of process 1500 (or any other processes described herein, or variations and/or combinations thereof) can be performed under control of one or more computer systems configured with computer-executable instructions and can be implemented as code (e.g., computer-executable instructions, one or more computer programs, or one or more applications) executing collectively on one or more processors, by hardware, software, or combinations thereof. Code can be stored on a computer-readable storage medium in form of a computer program comprising a plurality of computer-readable instructions executable by one or more processors. A computer-readable storage medium can be a non-transitory computer-readable storage medium. At least some computer-readable instructions usable to perform process 1500 cannot be stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals.

At 1502, the system may identify one or more root cause anomalies based at least in part on graph. In various embodiments, identifying the one or more root cause anomalies can be done by using methods described in conjunction with FIGS. 11-13. The one or more root cause anomalies might be the primary cause of the anomalies occurred throughout an infrastructure that stores one or more sets of resources. Identifying the one or more root cause anomalies might be determining anomalies detected in a time series data associated with one or more resource-metric pairs.

At 1504, the system may obtain a list of standard operating procedures that can address the one or more root cause anomalies. Standard operating procedures can include scripts or programs designed to address anomalies or recover from infrastructure failure. standard operating procedures can be tied to a particular root cause anomaly. For example, a standard operating procedure may be a script that resets a database, resets a network policy, modifies infrastructure to allocate more disk space or network bandwidth, or resets a computer system or service running on a computer system. In one embodiment, at least one service of the provider may contain a library of standard operating procedures that can be produced and managed by the system. standard operating procedures may be tested as part of the reliability assessment. Testing may include simulating failures that are projected to be repairable by the application of standard operating procedures with automated scripts, ensuring that alarms properly signal various types of infrastructure failure, and testing redundant or fault-tolerant aspects of the infrastructure to ensure that they function correctly.

At 1506, the system may determine one or more best standard operating procedures based at least in part on the one or more root cause anomalies. There might be a ranking for each standard operating procedure. In other words, there might be a priority with the standard operating procedure such that when multiple standard operating procedures are applicable to a given one or more root cause anomalies, certain standard operating procedures may be a preferred response. This might be done instead of the principal mapping certain standard operating procedures to the one or more root cause anomalies.

At 1508, the system may generate a recommendation that includes the one or more best standard operating procedures to perform. At least one embodiment, the system may support the management and suggests standard operating procedures to the principal, and the principal modifies the standard operating procedures in accordance with business requirements.

Figure 16:
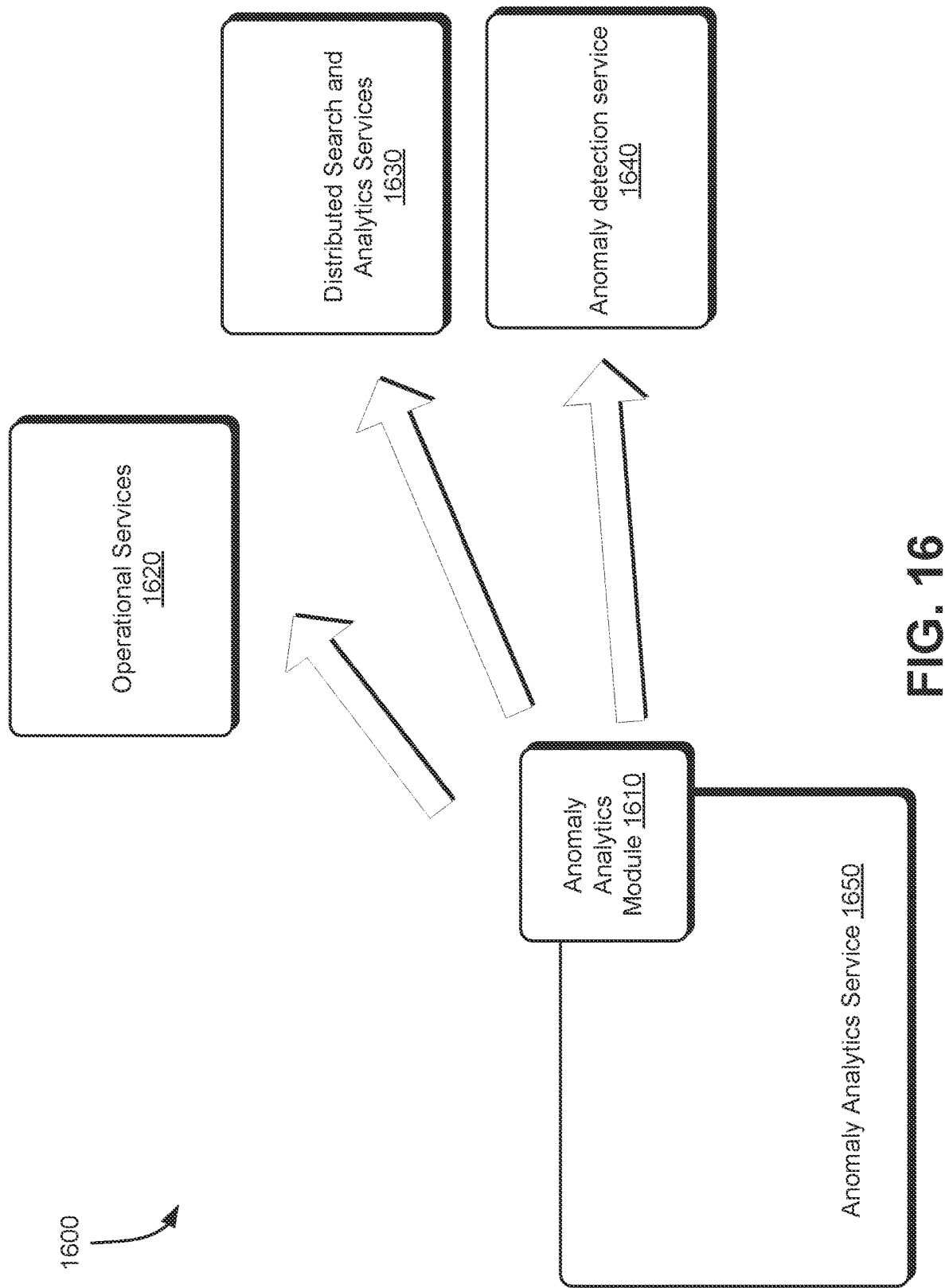
FIG. 16 is an illustrative example of a system in which various embodiments of the present disclosure can be practiced.

FIG. 16 is an illustrative example of a system 1600 in which various embodiments of the present disclosure can be practiced. The system 1600 may include an anomaly analytics module 1610 that can be attached to either operational services 1620, distributed search and analytics service 1630, or anomaly detection service 1640 that can be provided by one or more computing resource service providers. Alternatively, the anomaly analytics module 1610 can be part of anomaly analytics service 1650. The anomaly analytics service 1650 can be the anomaly analytics service 170 described in conjunction with FIG. 1. The anomaly analytics module 1610 is a container image. A container image may be a standalone, executable package of software that includes everything needed to run an application process: code, runtime, system tools, system libraries and settings. Container images become containers at runtime. Containers may be thus an abstraction of the application layer (meaning that each container simulates a different software application process). Though each container may run isolated processes, multiple containers can share a common operating system, for example by being launched within the same virtual machine. Operational services 1620, distributed search and analytics service 1630, or anomaly detection service 1640 are monitoring and analytics services that can benefit by anomaly analytics module 1610 pinpointing one or more root cause anomalies.

The anomaly analytics module 1610 can pinpoint one or more root cause anomalies that occurred in a distributed system architecture. In an example, the anomaly analytics module 1610 may be configured to pinpoint one or more root causes of anomalies that have occurred in a distributed system architecture. The distributed system architecture may include application stacks. The anomaly analytics module 1610 may receive infrastructure templates generated or modified by a principal, an infrastructure deployment service, or a computing resource service provider. The infrastructure templates may define application stacks that include a set of resources. The templates may list resources that are within the application stack and also contain properties that describe such resources. The properties may indicate relationships between resources within application stacks. One example of relationships can be dependencies between resources. Resources can be computing resources such as event-driven compute service, log service, database service, API gateway service, on-demand data storage service, monitoring service, infrastructure deployment service, and policy management service.

In the example, the anomaly analytics module 1610 may receive additional information. The additional information may include policies that can determined by a policy management service provided by the computing resource service provider. Such policies may include roles and/or permissions that may define the relationships between a resource within of the first application stack and another resource within a second application stack. If one resource has access to another resource based on the policy, then there is a link or dependency between the two resources. Additional information can be provided or overridden by one or more accounts of principals.

The anomaly analytics module 1610 may receive metrics associated with the resources within the distributed system architecture. Metrics can be either collected from individual resources within the distributed system architecture or by a monitoring service, provided by the computing resource service provider, that collects time series data from those resources. One or more application programming interface calls may be used to receive metrics data from different services provided by the computing resource service provider. Some metrics belong to different recipes. Such recipe is a group of metrics or metric-resource pairs (i.e., themes) that can be part of a particular domain. One example domain is operational metrics, and another example domain is business metrics. Operational metrics might be related to any kind of metric that is associated with functionality of at least one resource provided by the computing resource service provider. This can include any of various measures of technical aspects of a computing system, potentially including but not limited to various measures of technical aspects of a distributed system. Business metrics can be indicators that measure a business performance. Such business may operate one or more applications on the distributed system architecture. One example of a metric that could be art of business metrics is a number of sales, number of customers of the business.

The anomaly analytics module 1610 may generate a graph based on infrastructure templates, additional information, and metrics. The anomaly analytics module 1610 may list resources and exclude resources that are non-service related and generate a node for each resource. Then, the anomaly analytics module 1610, for each node, may generate nodes that correspond to resources that are associated with the node. Thus, each node of the graph may represent a resource-metric pair. Then, the anomaly analytics module 1610 may use the additional information and properties of the infrastructure templates to determine dependencies between individual nodes of the graph.

The anomaly analytics module 1610 may receive time series data that indicates anomalies associated with the resource-metric pair. By using the time series data, the anomaly analytics module 1610 may mark nodes that represent the resource-metric pair which anomalies are detected. A chain of dependencies can be established within anomalous nodes based at least in part on dependencies between individual nodes of the graph.

The anomaly analytics module 1610 may use a traverse algorithm to determine the root cause anomaly. The traverse algorithm parses each node within the chain of dependencies and find out the top node among the chain of dependencies. The chain of dependencies may include resource-metric pairs that belong to the same recipe. If there are more than two chain of dependencies that are not linked together, there can be two root cause anomalies that the anomaly analytics module 1610 identifies. The anomaly analytics module 1610 use an attribution algorithm to determine a contribution score for each anomalous node within the chain of dependencies. The contribution score may indicate how each anomalous nodes contributes to the anomaly associated with a target node. The target node can be, but not limited to, sink anomalous node of the chain of dependencies. The anomaly analytics module 1610 may analyze each anomalous node of the chain of dependencies without looking at the dependencies and determine additional factors that might affect the anomalies occurred within the distributed system architecture. The anomaly analytics module 1610 may determine what would be the most appropriate way to determine the root cause anomaly based on calculating robustness of the time series data. Alternatively, the anomaly analytics module 1610 may use two or all three methods to pinpoint the root cause anomaly. Root cause anomaly may correspond to different recipes that belongs to different domains.

The anomaly analytics module 1610, can obtain a list of standard operating procedures. Standard operating procedures can include scripts or programs designed to address anomalies or to recover from infrastructure failure. The anomaly analytics module 1610 may prioritize or rank the list of standard operating procedures based on the pinpointed root cause anomaly and generate a recommendation to the principal based on standard operating procedures that could address the root cause anomaly. The recommendation may provide detailed information of the pinpointed root cause anomaly. For example, detailed information can include relevant time series data that indicates anomalies that includes the root cause anomaly. Also, detailed information can include properties of a resource that is associated with the root cause node. After a principal causes standard operating procedures to be performed on the infrastructure based on the recommendation, the anomaly analytics module 1610 can obtain additional time series data indicating that the anomalies are resolved and no longer detected.

Figure 17:
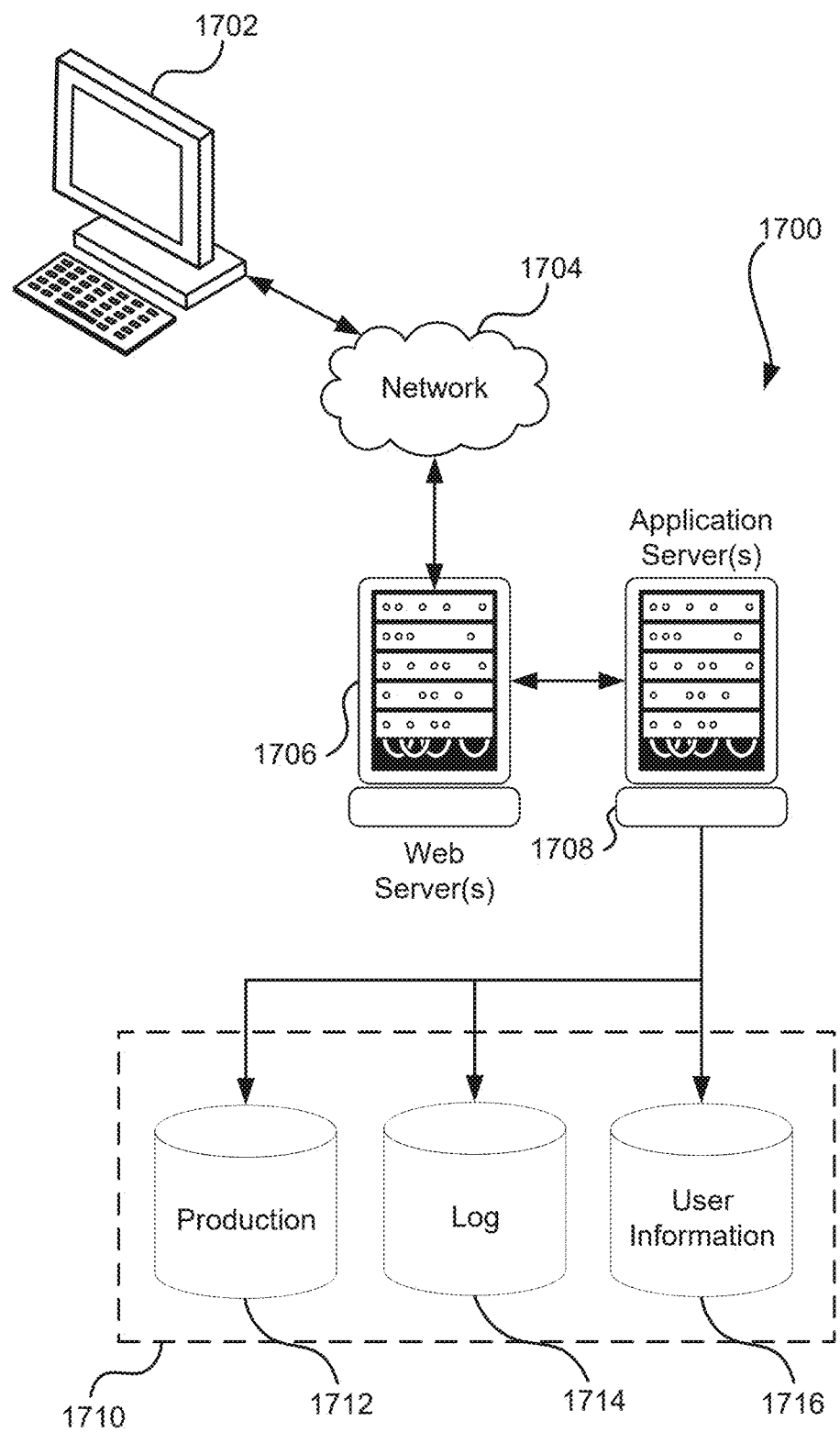
FIG. 17 illustrates a system in which various embodiments can be implemented.

FIG. 17 illustrates aspects of an example system 1700 for implementing aspects in accordance with an embodiment. As will be appreciated, although a web-based system is used for purposes of explanation, different systems may be used, as appropriate, to implement various embodiments. In an embodiment, the system includes an electronic client device 1702, which includes any appropriate device operable to send and/or receive requests, messages, or information over an appropriate network 1704 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 1706 for receiving requests and serving content in response thereto, although for other networks an alternative device serving a similar purpose could be used as would be apparent to one of ordinary skill in the art.

In an embodiment, the illustrative system includes at least one application server 1708 and a data store 1710, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 1702 and the application server 1608, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 1710, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 1712 and user information 1716, which are used to serve content for the production side. The data store also is shown to include a mechanism for storing log data 1714, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 1710.

The data store 1710, in an embodiment, is operable, through logic associated therewith, to receive instructions from the application server 1708 and obtain, update or otherwise process data in response thereto, and the application server 1708 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 1702. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 1700 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 1700, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 17. Thus, the depiction of the system 1700 in FIG. 17 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C #or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

At least one embodiment of the disclosure can be described in a first view of the following clauses:

1. A computer-implemented method, comprising:
    obtaining, from an infrastructure deployment service, an infrastructure template that describes a portion of an architecture of a system comprising a set of resources, wherein the set of resources includes a first resource and a second resource;
    generating a first directed graph by at least:
        generating a first node that represents the first resource and a second node that represents the second resource, and
        determining a dependency between the first node and the second node based at least in part on the infrastructure template;
    obtaining first data indicating that a first metric is associated with the first resource and second data indicating that a second metric is associated with the second resource.
    generating a second directed graph by at least:
        generating a first node of the second directed graph that represents the first resource and the first metric;
        generating a second node of the second directed graph that represents the second resource and the second metric; and
        determining a dependency between the first node and the second node based at least in part on the first directed graph; and
    generating an information that indicates at least one node of the second directed graph.
2. The computer-implemented method of clause 1, wherein:
    the set of resources comprises a first subset of resources and a second subset of resources; and
    the computer-implemented method further comprises obtaining a policy information that indicates dependency information between the first subset of resources and the second subset of resources.
3. The computer-implemented method of clause 1 or 2, further comprising obtaining, from an infrastructure deployment service, a second infrastructure template that describes a second portion of the architecture of the system.
4. The computer-implemented clause of any of clauses 1-3, wherein the first data indicates that more than one metric is associated with the first resource.
5. A system, comprising:
    at least one processor; and
    at least one memory comprising computer-executable instructions that, in response to execution by the at least one processor, cause the system to at least:
        obtain an infrastructure template that describes a set of resources of an architecture of a second system;
        generate a first directed graph by at least determining at least one dependency between two or more nodes of the first directed graph using at least the infrastructure template, wherein the two or more nodes of the first directed graph represent different resources of the set of resources;
obtain data indicating associations between resources of the set of resources and metrics;
generate a second directed graph by at least determining at least one dependency between the two or more nodes of the second directed graph based at least in part on the first directed graph and the data, wherein the two or more nodes of the second directed graph represent the associations; and
generate an information that indicates at least one node of the second directed graph.

6. The system of clause 5, wherein the computer-executable instructions, in response to execution by the at least one processor, further cause the system to obtain time series data of the metric, wherein the time series data indicates an anomaly of at least one resource of the set of resources.

7. The system of clause 5 or 6, wherein the computer-executable instructions, in response to execution by the at least one processor, further cause the system to:
determine that at least a node of the first directed graph represents a resource of the set of resources that is a non-service resource; and
delete the node from the first directed graph.

8. The system of any of clauses 5-7, wherein at least two nodes of the second directed graph represents same resource but different metrics that are associated with the same resource.

9. The system of any of clauses 5-8, wherein:
at least one resource of the set of resources is associated with a role that indicates an association between resources of the set of resources; and
the association is represented by at least one edge that connects nodes within the first directed graph.

10. The system of any of clauses 5-9, wherein the infrastructure template describes configuration of the set of resources in at least one of a JavaScript Object Notation (JSON), Extensible Markup Language (XML), or YAML format.

11. The system of any of clauses 5-10, wherein the computer-executable instructions, in response to execution by the at least one processor, further cause the system to obtain a second infrastructure template that describes a second set of resources of an architecture of a second system.

12. The system of any of clauses 5-11, wherein the computer-executable instructions, in response to execution by the at least one processor, further cause the system to obtain, from a client device, an indication that at least two resources of the set of resources are associated with each other.

13. A non-transitory computer-readable storage medium storing thereon executable instructions that, in response to execution by one or more processors of a computer system, cause the computer system to at least:
obtain data of an architecture of a system comprising two or more sets of resources, wherein the data includes properties of the two or more sets of resources and a plurality of metrics associated with each resource of the set of resources;
generate a graph by at least:
determining a first pair between a first resource of the two or more sets of resources a first metric of the plurality of metrics using at least the data;
determining a second pair between a second resource of the two or more sets of resources a second metric of the plurality of metrics using at least the data;
generating a first node of the graph that corresponds to the first pair;
generating a second node of the graph that corresponds to the second pair; and
determining a dependency between the first node and the second using at least the properties of the set of resources; and generate an indication based, at least in part, on at least one node of the graph.

14. The non-transitory computer-readable storage medium of clause 13, wherein data further includes two or more infrastructure templates that indicate different sets of two or more sets of resources.

15. The non-transitory computer-readable storage medium of clause 13 or 14, wherein the data further includes policy information that indicates dependencies between different sets of two or more sets of resources.

16. The non-transitory computer-readable storage medium of any of the clauses 13-15, wherein the policy information indicates one or more roles or permissions associated with at least one resource of the two or more sets of resources.

17. The non-transitory computer-readable storage medium of any of the clauses 13-16, wherein the dependencies are associated with confidence scores.

18. The non-transitory computer-readable storage medium of any of the clauses 13-17, wherein the set of resources comprises at least one of an API gateway service, database service, or event-driven function service.

19. The non-transitory computer-readable storage medium of any of the clauses 13-18, wherein the two or more sets of resources are associated with an account of a computing resource service provider.

20. The non-transitory computer-readable storage medium of any of the clauses 13-19, wherein the instructions further comprise instructions that, as a result of being executed by the one or more processors, cause the computer system to obtain time series data that is associated with an account of the computing resource service provider.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method, comprising:
   in response to obtaining a time series data that indicates two or more anomalies detected on a system, determining a root cause anomaly that caused the two or more anomalies by at least:

generating a directed graph comprising nodes that represent a plurality of resource-metric pairs of the system, wherein a resource-metric pair of the plurality of resource-metric pairs indicates an association between a resource and a metric; and determining a node from a subset of nodes that are associated with the two or more anomalies based at least in part on dependencies between nodes from the subset of nodes and the time series data, wherein the node indicates the root cause anomaly;

obtaining a set of standard operating procedures (SOP) that are associated with the system;

determining a subset of SOPs from the set of SOPs, wherein individual SOPs within the subset of SOPs are usable to resolve the root cause anomaly; and providing, to a client device that is associated with the system, a recommendation that includes an SOP from the subset of SOPs that is selected based, at least in part on, a ranking of the subset of SOPs.

2. The computer-implemented method of claim 1, wherein an SOP of the set of SOPs corresponds to a resource-metric pair of the plurality of resource-metric pairs.

3. The computer-implemented method of claim 1, wherein the set of SOPs is specifically adapted to an account that is associated with the system.

4. The computer-implemented method of claim 1, wherein the recommendation comprises information of the root cause anomaly.

5. A system, comprising:
at least one processor; and
at least one memory comprising computer-executable instructions that, in response to execution by the at least one processor, cause the system to at least:
in response to time series data that indicates two or more anomalies detected from a second system, generate a directed graph of an architecture of the second system comprising a set of resources, wherein a node of the directed graph represents a resource of the set of resources and a metric that is associated with the resource;

determine a root cause node among a subset of nodes that are associated with the two or more anomalies based at least in part on dependencies between nodes of the subset of nodes and the time series data, wherein an anomaly associated with the root cause node is a root cause anomaly;

determine, from a set of actions to be performed by the second system, a subset of actions that each addresses the root cause anomaly; and provide a recommendation to perform an action that is selected from the subset of actions based, at least in part, on a ranking of the subset of actions.

6. The system of claim 5, wherein the subset of actions include one or more operations on at least one resource of the set of resources.

7. The system of claim 5, wherein the computer-executable instructions, in response to execution by the at least one processor, further cause the system to obtain a second times series data indicating that no anomaly was detected in the second system.

8. The system of claim 5, wherein the computer-executable instructions, in response to execution by the at least one processor, further cause the system to obtain, from a client device, information indicative of at least one action of the set of actions.

9. The system of claim 8, wherein at least one action of the set of actions is specifically adapted to an account that is associated with the second system.

10. The system of claim 5, wherein the computer-executable instructions, in response to execution by the at least one processor, further cause the system to obtain a data structure that indicates at least the association between the resource and the metric.

11. The system of claim 5, wherein the computer-executable instructions that cause the system to determine the determine a root cause node further comprise computer-executable instructions, in response to execution by the at least one processor, further cause the system to:
indicate a chain of dependencies using at least the dependencies between nodes of the subset of nodes; and
determine a score that indicates how anomalies associated with nodes within the chain of dependencies contribute to the anomaly associated with a bottom node of the chain of dependencies.

12. The system of claim 5, wherein the set of resources comprises at least one of an API gateway service, database service, or event-driven function service.

13. A non-transitory computer-readable storage medium storing thereon executable instructions that, in response to execution by one or more processors of a computer system, cause the computer system to at least:
generate a graph of an architecture of a system comprising a plurality of resources, wherein a node of the graph represents an association between a resource of the plurality of resources and a metric of the resource;
determine a root cause node based at least in part on dependencies between nodes of a plurality of anomalous nodes, wherein a node of the plurality of anomalous nodes corresponds to an anomaly of at least two anomalies detected from the system;
identify two or more remedial measures from a set of remedial measures where each of the two or more remedial measures is usable to address a root cause anomaly that is associated with the root cause node; and
provide information that indicates a remedial measure from the two or more remedial measures that is selected based, at least in part, on how the two or more remedial measures are ranked.

14. The non-transitory computer-readable storage medium of claim 13, wherein instructions further comprise instructions that, as a result of being executed by the one or more processors, cause the computer system to determine scores for the plurality of anomalous nodes based, at least in part, on time series data that indicates the at least two anomalies detected from the system, wherein the scores are usable to determine the root cause node.

15. The non-transitory computer-readable storage medium of claim 13, wherein the remedial measures include scripts or programs to affect at least one resource from the system.

16. The non-transitory computer-readable storage medium of claim 13, wherein instructions further comprise instructions that, as a result of being executed by the one or more processors, cause the computer system to obtain an infrastructure template identifying one or more properties of the plurality of resources.

17. The non-transitory computer-readable storage medium of claim 13, wherein the information includes time series data that indicates the root cause anomaly or properties of a resource that is associated with the root cause node.

18. The non-transitory computer-readable storage medium of claim 13, wherein at least two remedial measures of the set of remedial measures are associated with different resources of the plurality of resources.

19. The non-transitory computer-readable storage medium of claim 13, wherein the plurality of resources comprises at least one of an API gateway service, database service, or event-driven function service.

20. The non-transitory computer-readable storage medium of claim 13, wherein the plurality of resources is associated with an account of a computing resource service provider.

\* \* \* \* \*